United States Patent
Grube et al.

(10) Patent No.: US 9,489,533 B2
(45) Date of Patent: Nov. 8, 2016

(54) EFFICIENT MEMORY UTILIZATION IN A DISPERSED STORAGE SYSTEM

(71) Applicant: CLEVERSAFE, INC., Chicago, IL (US)

(72) Inventors: Gary W. Grube, Barrington Hills, IL (US); Timothy W. Markison, Mesa, AZ (US); S. Christopher Gladwin, Chicago, IL (US); Jason K. Resch, Chicago, IL (US); Wesley Leggette, Chicago, IL (US); Andrew Baptist, Mt. Pleasant, WI (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/312,550

(22) Filed: Jun. 23, 2014

(65) Prior Publication Data

US 2014/0304527 A1    Oct. 9, 2014

Related U.S. Application Data

(63) Continuation of application No. 12/902,684, filed on Oct. 12, 2010, now Pat. No. 8,762,343.

(60) Provisional application No. 61/290,662, filed on Dec. 29, 2009.

(51) Int. Cl.
*G06F 17/30* (2006.01)
*G06F 21/62* (2013.01)
(Continued)

(52) U.S. Cl.
CPC ........... *G06F 21/6218* (2013.01); *G06F 21/64* (2013.01); *H04L 9/3236* (2013.01); *G06F 11/1076* (2013.01); *G06F 11/1453* (2013.01); *G06F 11/1464* (2013.01); *G06F 2211/1028* (2013.01); *H04L 2209/34* (2013.01); *H04L 2209/603* (2013.01)

(58) Field of Classification Search
CPC .................................................. G06F 17/30097
See application file for complete search history.

(56) References Cited

U.S. PATENT DOCUMENTS 4,092,732 A   5/1978   Ouchi
5,454,101 A   9/1995   Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Khanh Pham
(74) *Attorney, Agent, or Firm* — Garlick & Markison; Timothy W. Markison

(57) ABSTRACT

A method for improving memory utilization in a dispersed storage network (DSN). After a data object is received for storage in the DSN, it is determined whether a substantially identical data portion of the data object has previously been encrypted and stored. The determination may be made, for example, by comparing a portion reference value relating to the data object to portion reference information stored in DSN memory. If not detected, the data object is encrypted using an encryption pattern sequence and encryption key, at least one of which substantially identical to at least a portion of the data portion. The encrypted data object is then compressed using a pattern based data compression function, and the compressed data object is stored. The portion reference value is also stored in DSN memory.

17 Claims, 18 Drawing Sheets

(51) Int. Cl.
*G06F 21/64* (2013.01)
*H04L 9/32* (2006.01)
*G06F 11/14* (2006.01)
*G06F 11/10* (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,277,543 | B1* | 10/2007 | Driscoll .................... 380/43 |
| 7,636,724 | B2 | 12/2009 | de la Torre et al. |
| 8,117,464 | B1* | 2/2012 | Kogelnik ................ 713/193 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0147821 | A1* | 6/2008 | Dietrich et al. .............. 709/216 |
| 2008/0175384 | A1* | 7/2008 | Byrne et al. .................. 380/255 |
| 2008/0214300 | A1* | 9/2008 | Williams et al. ............... 463/29 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

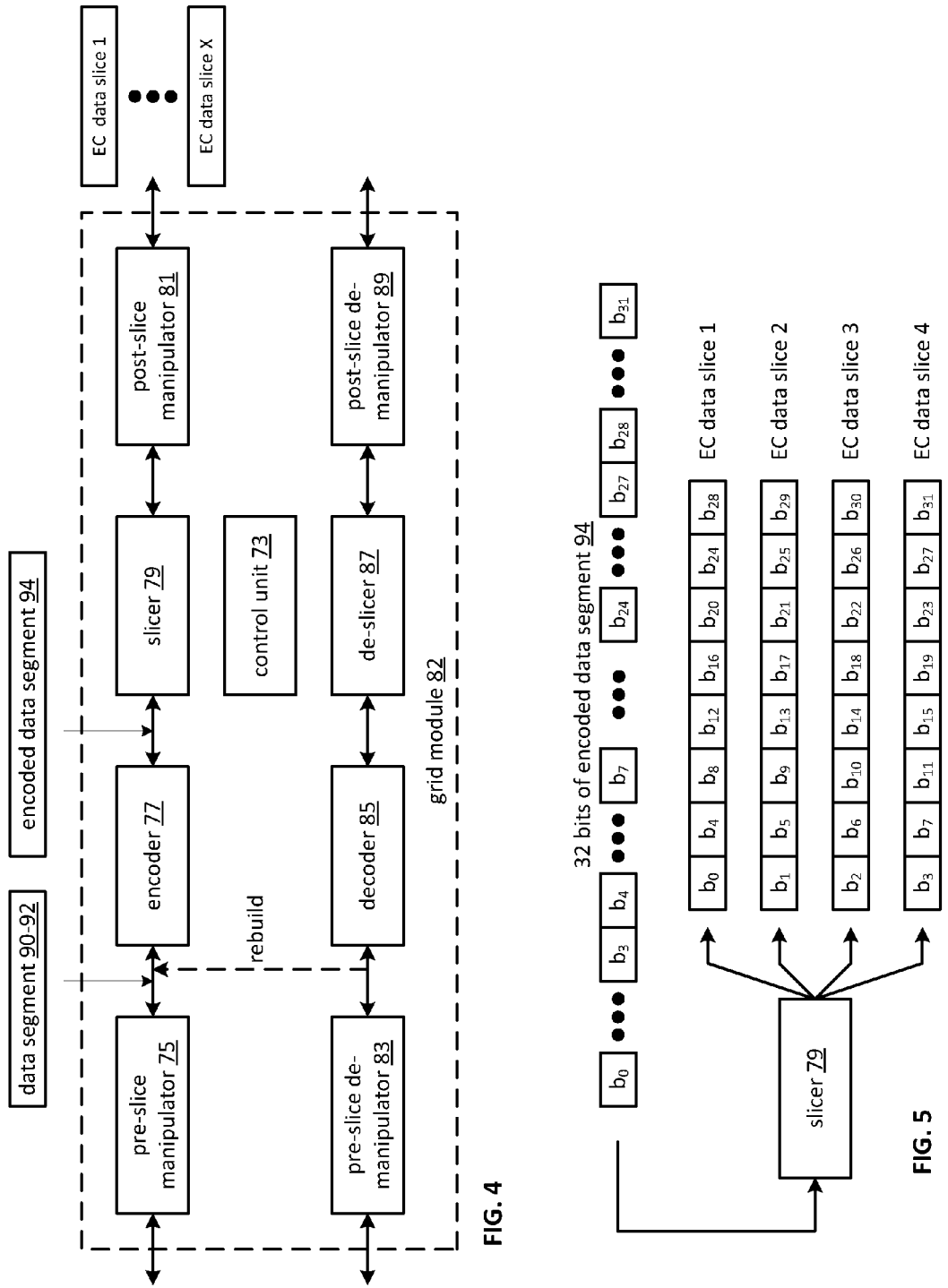

profile table 230

| profile number 232 | profile 234 | DSN address of system data record 236 |
|---|---|---|
| 1 | 101 | 707 |
| 2 | 202 | 901 |

FIG. 14

DSN data records 238

| DSN address 240 | user ID 242 | profile number 244 | data portion 246 |
|---|---|---|---|
| 707 | 0 | 1 | a73b9e300f... |
| 901 | 0 | 2 | 73092f3a9c0... |
| 706 | 1 | 1 | - |
| 1101 | 1 | 2 | - |
| 1010 | 2 | 1 | - |
| 1020 | 2 | 2 | - |

FIG. 15

DSN key records 248

| DSN address 250 | user ID 252 | profile number 254 | key 256 |
|---|---|---|---|
| 601 | 0 | 1 | f928932c... |
| 602 | 0 | 2 | 4b8420... |
| 600 | 1 | 1 | d390b9... |
| 402 | 1 | 2 | 7bc301... |
| 505 | 2 | 1 | 830be5... |
| 939 | 2 | 2 | 30f3bc... |

FIG. 16

DSN directory 258

| user ID 260 | data object ID 262 | profile number 264 | user data address 266 | user key address 268 | sys data address 270 | sys key address 272 |
|---|---|---|---|---|---|---|
| 0 | foo | 1 | 707 | 601 | 707 | 601 |
| 0 | foo | 2 | 901 | 602 | 901 | 602 |
| 1 | foo | 1 | 706 | 600 | 707 | 601 |
| 1 | foo | 2 | 1101 | 402 | 901 | 602 |
| 2 | foo | 1 | 1010 | 505 | 707 | 601 |
| 2 | foo | 2 | 1020 | 939 | 901 | 602 |

FIG. 17

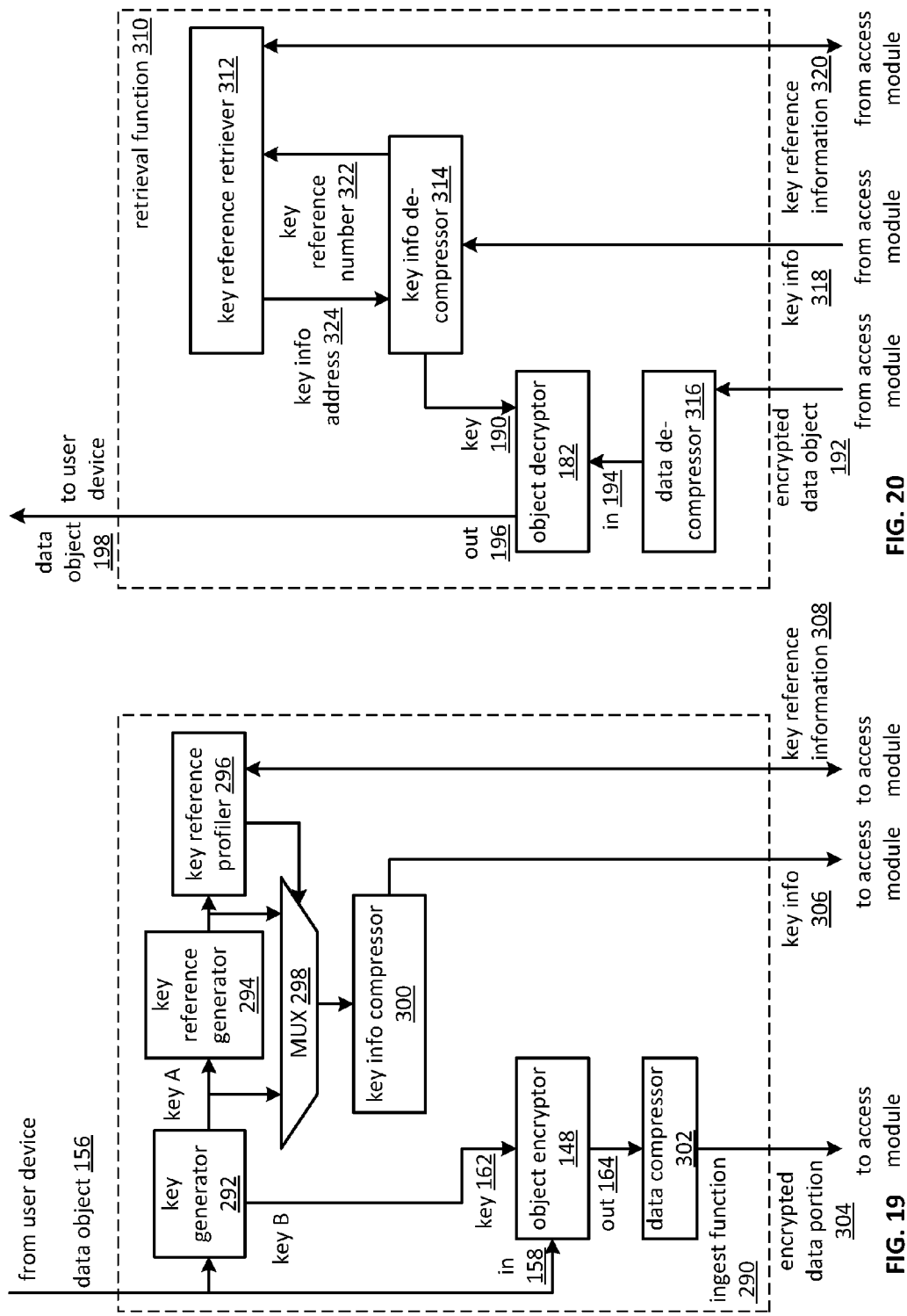

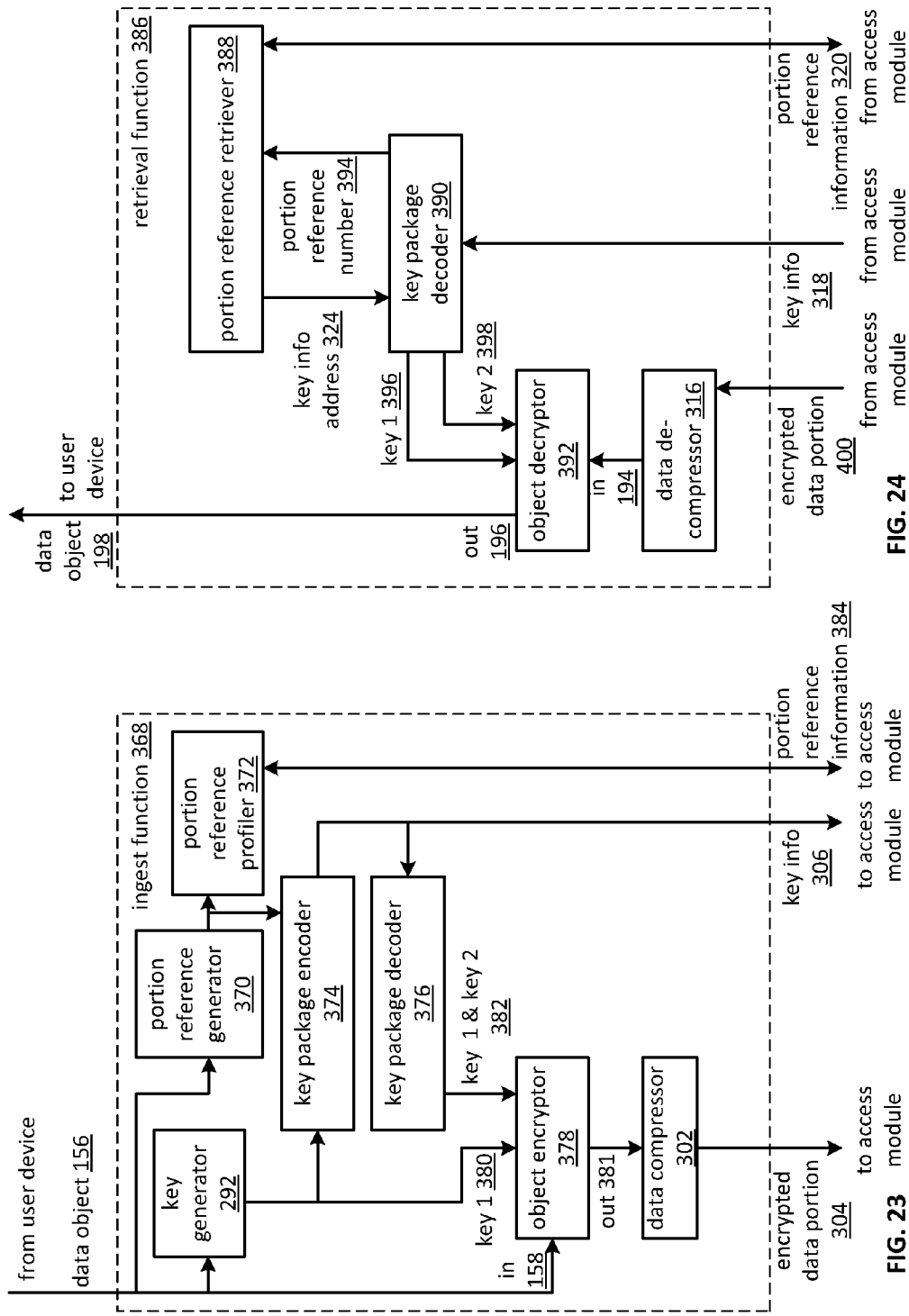

EFFICIENT MEMORY UTILIZATION IN A DISPERSED STORAGE SYSTEM

CROSS REFERENCE TO RELATED PATENTS

The present U.S. Utility Patent Application claims priority pursuant to 35 U.S.C. §120 as a continuation of U.S. Utility application Ser. No. 12/902,684, entitled "DISPERSED STORAGE OF SOFTWARE", filed Oct. 12, 2010, which claims priority pursuant to 35 U.S.C. §119(e) to U.S. Provisional Application No. 61/290,662, entitled "DISTRIBUTED STORAGE OF SOFTWARE," filed Dec. 29, 2009, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As additional examples, papers, books, video entertainment, home video, etc. are now being stored digitally, further increasing the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 14 is a table illustrating an example of a profile table in accordance with the invention;

FIG. 15 is a table illustrating an example of dispersed storage network (DSN) data records in accordance with the invention;

FIG. 16 is a table illustrating an example of dispersed storage network (DSN) key records in accordance with the invention;

FIG. 17 is a table illustrating an example of a dispersed storage network (DSN) directory in accordance with the invention;

FIG. 19 is another schematic block diagram of an embodiment of another ingest function in accordance with the invention;

FIG. 20 is another schematic block diagram of an embodiment of another retrieval function in accordance with the invention;

FIG. 23 is another schematic block diagram of an embodiment of another ingest function in accordance with the invention;

FIG. 24 is another schematic block diagram of an embodiment of another retrieval function in accordance with the invention;

DETAILED DESCRIPTION OF THE INVENTION

Figure 1:
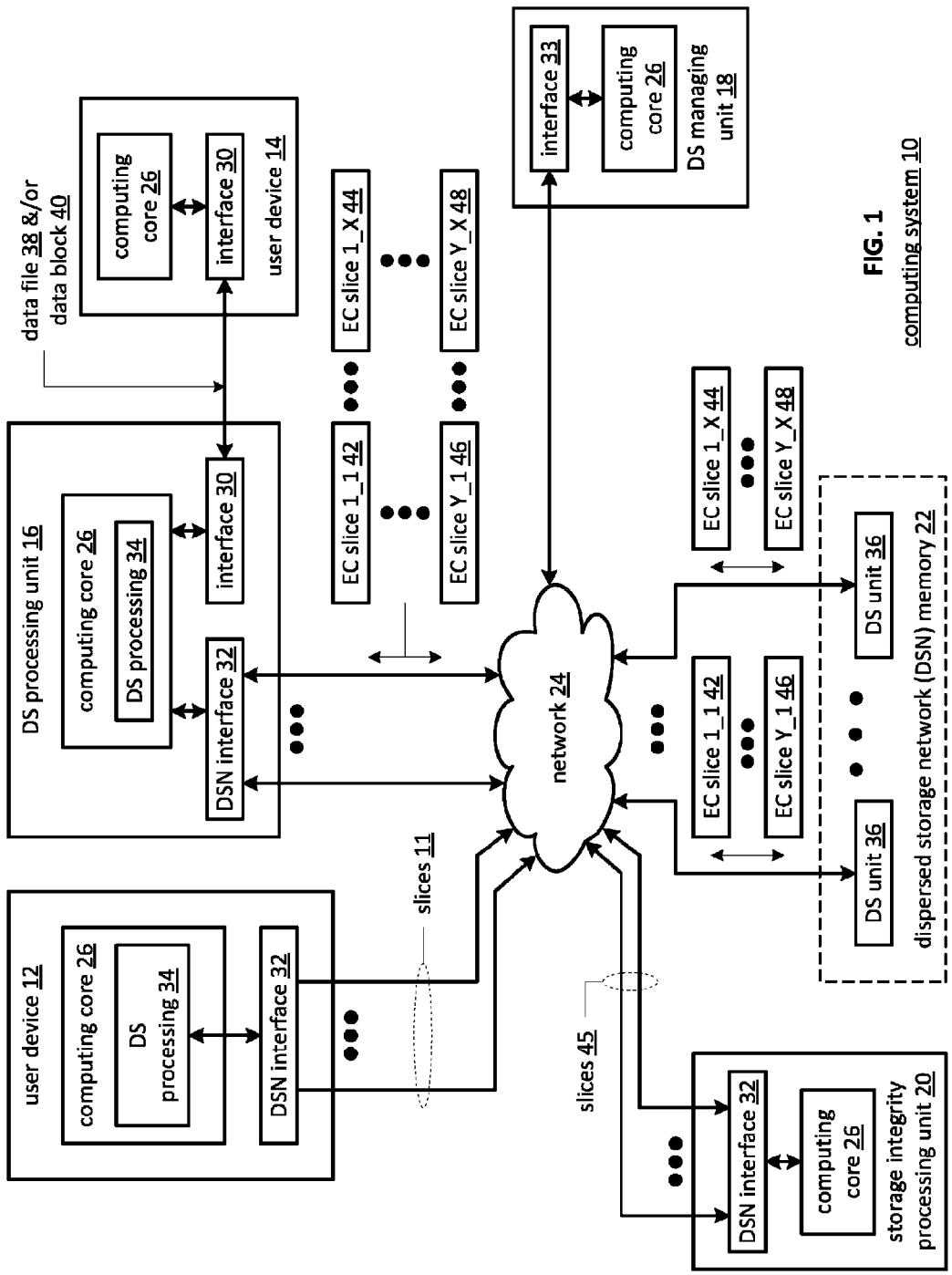
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-26.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-26.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
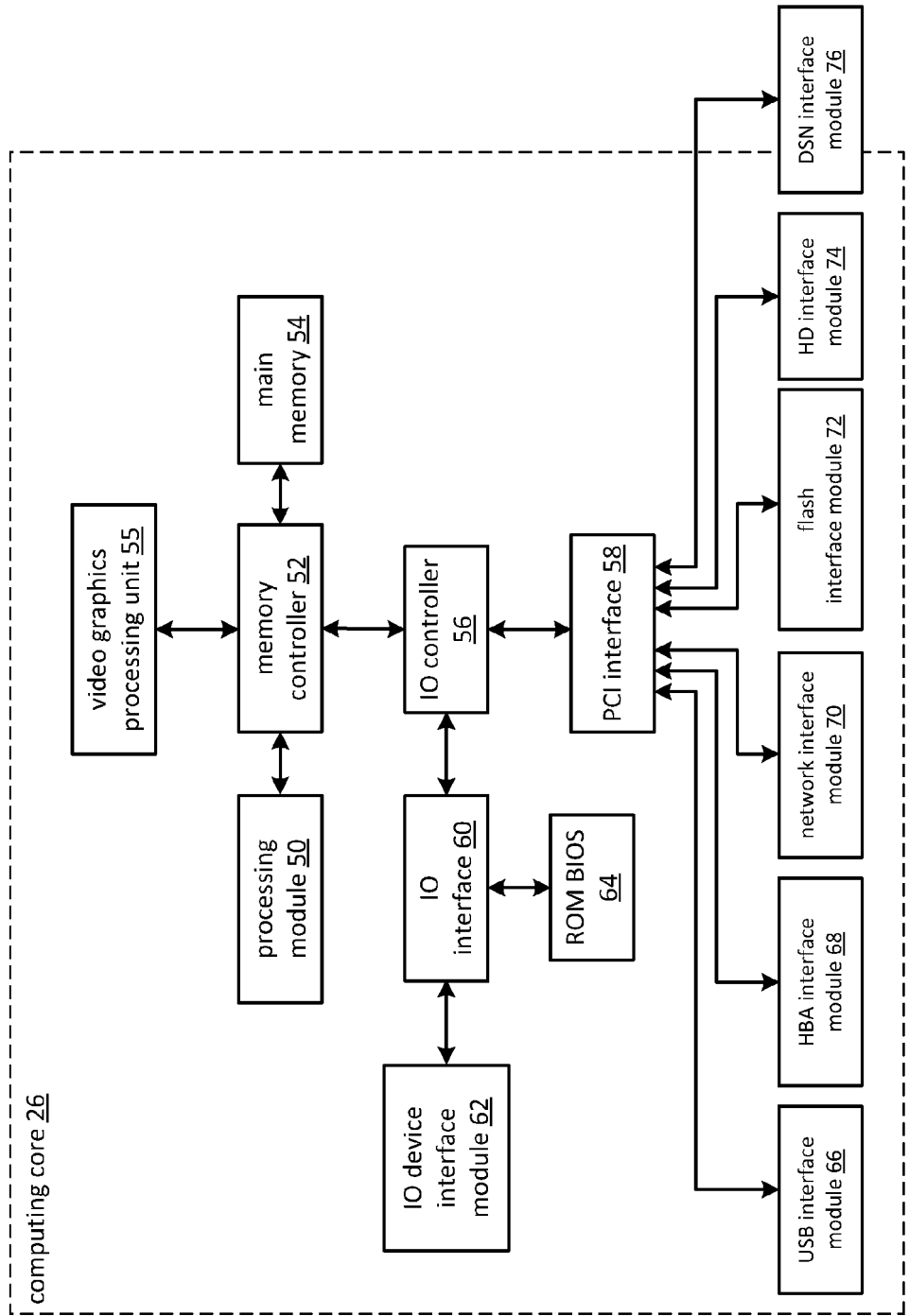
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-26.

Figure 3:
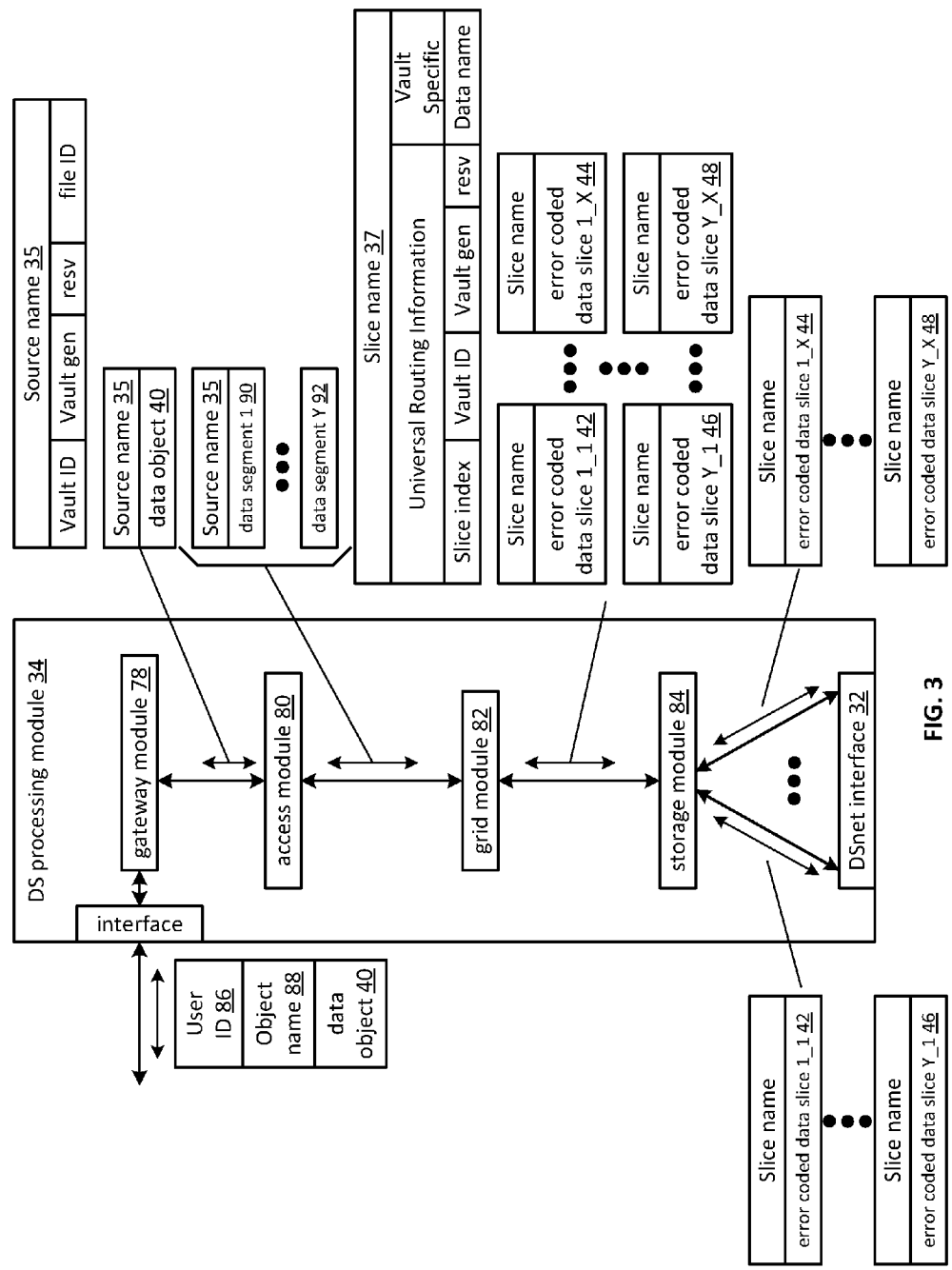
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, a user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., perform compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon encoding, convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation number, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, other redundancy or pattern based compression algorithms, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 90-92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
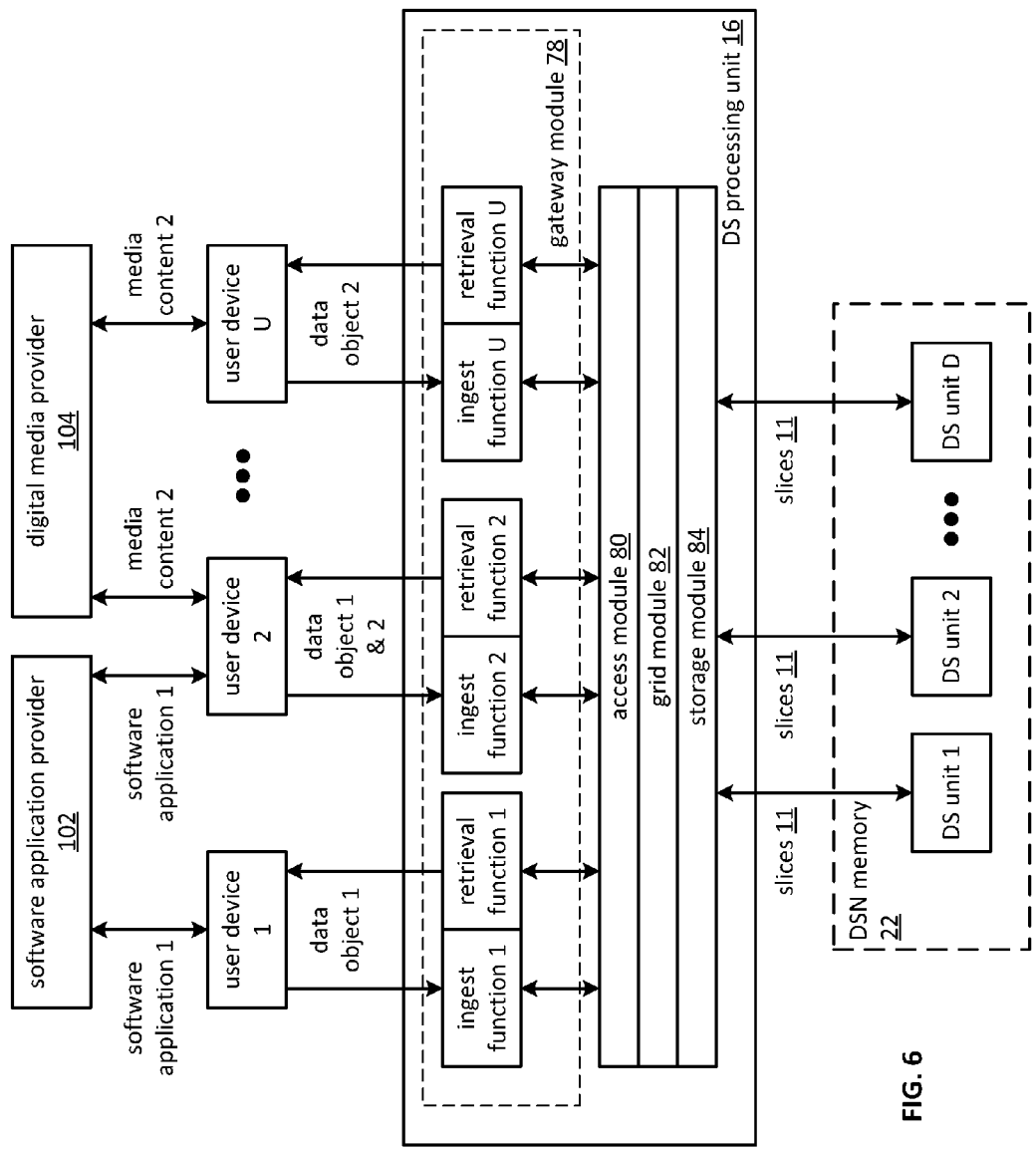
FIG. 6 is another schematic block diagram of another embodiment of a computing system in accordance with the invention.

FIG. 6 is another schematic block diagram of another embodiment of a computing system where a dispersed storage network (DSN) provides data de-duplication when storing substantially the same data from a plurality of user devices. As illustrated, the system includes a software application provider 102, a digital media provider 104, a plurality of user devices 1-U, a dispersed storage (DS) processing unit 16, and a DSN memory 22. As illustrated, the DSN memory 22 includes a plurality of DS units 1-D. The DS units 1-D operate as previously discussed. As illustrated, the DS processing unit 16 includes a gateway module 78, an access module 80, a grid module 82, and a storage module 84. The access module 80, the grid module 82, and the storage module 84 operate as previously discussed. As illustrated, the gateway module 78 includes a plurality of ingest functions 1-U and a plurality of retrieval functions 1-U. In another implementation example, one or more of the ingest functions 1-U and/or one or more of the of retrieval functions 1-U are implemented in one or more of the user devices 1-U.

In example of operation, user device 2 receives digital content from one or more digital content providers including the software application provider 102 and digital media provider 104. For instance, user device 2 receives a software application 1 (e.g., a text editing application) from the software application provider 102 and a media content 2 (e.g., a movie) from the digital media provider 104. Note that the digital content may be licensed for use by the user of the user devices 1-U. One or more of the user devices 1-U may backup the digital content in the DSN memory 22 in one licensing scenario where a licensee is allowed to store one copy of the digital content. One or more of the user devices may send digital content to the DS processing unit 16 for backup storage in the DSN memory 22. In an example, user device 1 receives software application 1 from the software application provider 102 and sends that content as data object 1 to the DS processing unit 16 for backup storage in the DSN memory 22. Note that at least one other user device may receive the same digital content requiring backup storage in the same DSN memory 22. For instance, user device 2 receives software application 1 from the software application provider 102 and sends that content as data object 1 to the DS processing unit 16 for backup storage in the DSN memory 22.

In a storage example of operation, the DS processing unit 16 receives data objects received from each user device 1-U and determines how to desirably (e.g., efficiency, reliability, security, performance, cost, etc.) store the data objects (e.g., as encoded data slices) in the DSN memory 22. In such a determination, the DS processing unit 16 may provide unique storage for each user device 1-U such that the user device can retrieve data objects from the DS processing unit 16 that the user device previously sent to the DS processing unit 16 for storage. Note that each user device 1-U is matched to a corresponding unique pair of ingest functions 1-U and retrieval functions 1-U. In an example, user device 2 sends data object 2 to ingest function 2 for storage and may subsequently receive data object 2 from retrieval function 2 in response to a retrieval request. Note that the same data object 2 may be sent to the DS processing unit 16 for backup by another user device to a different ingest function. In one example, user device U sends data object 2 to ingest function U for storage and may subsequently receive data object 2 from retrieval function U in response to a retrieval request.

As illustrated, the ingest functions 1-U and retrieval functions 1-U are operably coupled to the access module 80. In another implementation example, the ingest functions 1-U and retrieval functions 1-U are operably coupled to one or more of the grid module 82, the storage module 84, and the DSN memory 22. In an example of a storage operation, ingest function 1 receives a store data object message from user device 1 where the store data object message includes one or more of a store command, a store request, a user device ID, a data object name, a revision number, directory information, a data object 1, a data object hash, a data object portion size indicator, a data object size indicator, a data object type indicator, a priority indicator, a security indicator, a performance indicator, and digital rights management (DRM) information. The DRM information may include one or more of a digital content type indicator, a copyright indicator, an owner identifier (ID), a licensee ID info, license credentials of user device, and any other information indicating status and access rights of the digital content.

In the storage example continued, ingest function 1 determines operational parameters including one or more of pillar width n, a read threshold, a write threshold, DS units assigned to the user vault, a compression method, a decompression method, one or more encryption methods, one or more decryption methods, private encryption and decryption keys, and public encryption and decryption keys. Such a determination may be based on one or more of the contents of the store data object message, a vault lookup, a command, a predetermination, a table lookup, a DSN records lookup, information about previously stored data objects, computing system status, and other determinations as a function of at least some of the previous variables. The ingest function 1 processes the data object 1 in accordance with the operational parameters and an ingest method that may include one or more of partitioning, reordering, profiling, cataloging, registering, encoding, compressing, encryption key generation, encryption key storing, data encryption, encrypted data storage, linking, and tracking. For instance, the ingest function 1 partitions the data object 1 into portions. The ingest function 1 encrypts each portion utilizing a unique random key and stores the encrypted data in the DSN memory 22 as encoded data slices. The ingest function 1 encrypts the random key and stores the encrypted random key in the DSN memory 22 as encoded key slices. Alternatively, or in addition to, ingest function 1 sends the encoded key slices to the user device 1 to enable subsequent retrieval of the data object 1.

In an example of retrieval, retrieval function 1 receives a retrieve data object 1 message from the user device where the retrieve data object message may include one or more of a retrieve command, a retrieve request, a user device ID, a data object name, a revision number, directory information, a data object hash, a data object portion size indicator, a data object size indicator, a data object type indicator, a priority indicator, a security indicator, a performance indicator, and digital rights management (DRM) information. The retrieval function 1 determines operational parameters based on one or more of the contents of the retrieve data object message, a vault lookup, a command, a predetermination, a table lookup, a DSN records lookup, information about previously stored data objects, computing system status, and other determinations as a function of at least some of the previous variables.

In the retrieval example continued, the retrieval function 1 retrieves information from the DSN memory 22 in accordance with the operational parameters and a retrieval method that may include one or more of tracking, linking, profiling, cataloging, registration checking, encryption key retrieving, decompressing, decoding, encryption key regeneration, encrypted data retrieval, data decryption, reordering, and partition aggregation. The retrieval function 1 processes the retrieved information to reproduce the requested data object in accordance with the operational parameters and the retrieval method. For example, the retrieval function 1 decrypts an encrypted random key from the DSN memory 22 and utilizes the decrypted key to decrypt the encrypted data retrieved from the DSN memory 22 to produce a portion of the data object. The retrieval function 1 repeats the above steps to create each portion of the data object. The retrieval function 1 aggregates the portions to create the data object. The retrieval function sends the data object to the user device 2 that requested the retrieval. The method operation of the ingest function and retrieval function are discussed in greater detail with reference to FIGS. 7-26.

Figure 7:
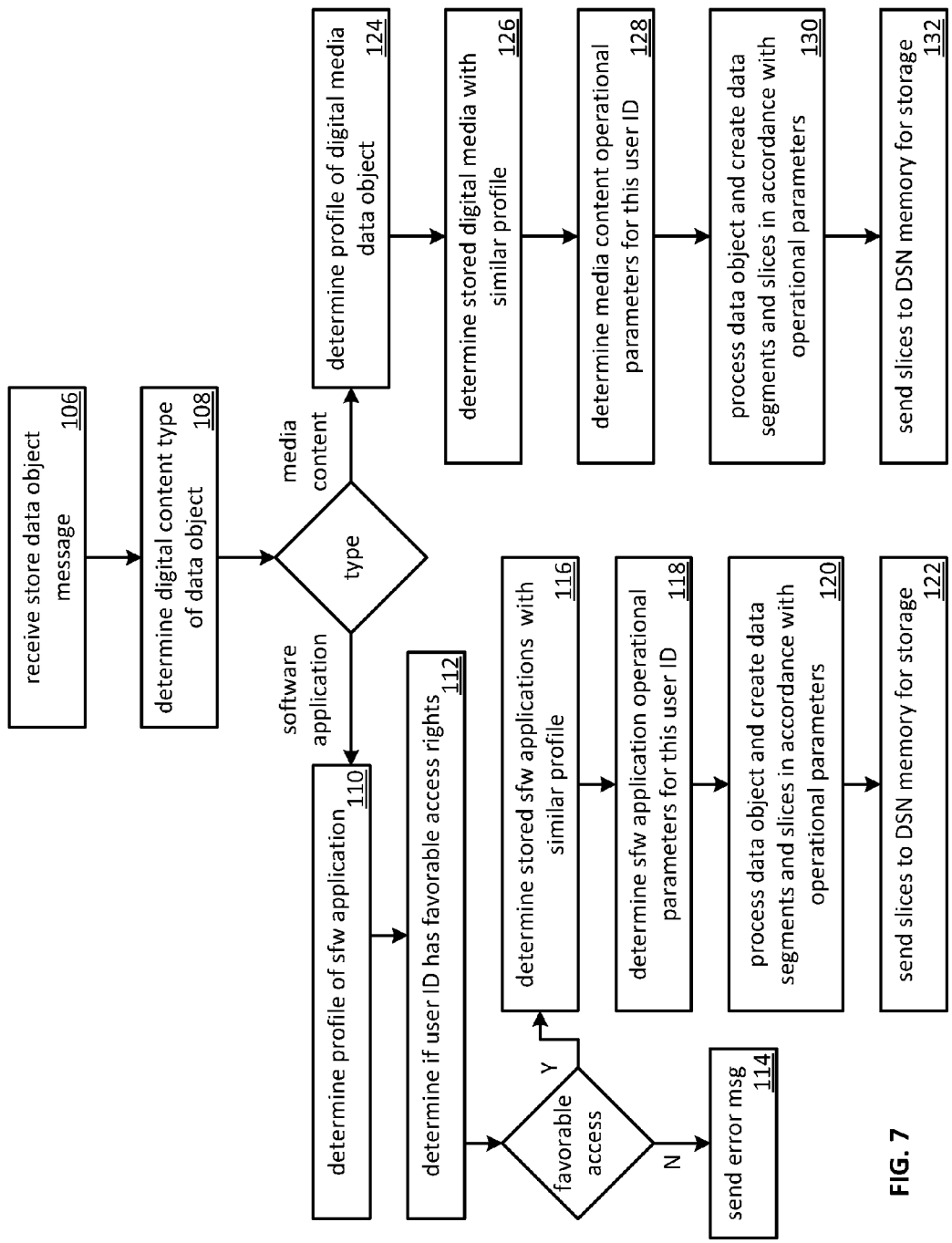
FIG. 7 is a flowchart illustrating an example of ingesting data in accordance with the invention.

FIG. 7 is a flowchart illustrating an example of ingesting data by a processing module (e.g., of an ingest function) to provide primary and/or backup storage based on a digital content type of the data. The method begins with step 106 where the processing module receives a store data object message discussed with reference to FIG. 6 from the one of a user device, a dispersed storage (DS) processing unit, a storage integrity processing unit, a DS managing unit, and/or a DS unit. The method continues at step 108 where the processing module determines the digital content type (e.g., software or media) of a data object based on content of the store data object message and/or a list of digital content. In an example, a data object type indicator of the store data object message may indicate that the data object is a licensed software application and digital rights management (DRM) information of the store data object message may indicate that a user identifier (ID) has a valid license. In another example, the DRM information of the store data object message may indicate that the data object is a licensed media content type (e.g., a commercial movie).

The method branches to step 110 when the processing module determines the digital content type of the data object as a software application. The method branches to step 124 when the processing module determines the digital content type of the data object as digital media content. At step 124, the processing module determines a profile of the digital media data where the profile may characterize the data object in an efficient compact form much smaller than the data object. Such a determination may be based on one or more of a hash of the data object, contents of the store data object message, a vault lookup, a command, a predetermination, a table lookup, a dispersed storage network (DSN) records lookup, information about previously stored data objects, computing system status, and other determinations as a function of at least some of the previous variables. In an example, the processing module calculates a hash for at least a portion of the data object and determines the profile as the hash.

The method continues at step 126 where the processing module determines stored digital media with a similar profile based on one or more of a profile of the received data object, a profile search of previously stored data objects, contents of the store data object message, a vault lookup, a command, a predetermination, a table lookup, a DSN records lookup, information about previously stored data objects, computing system status, and other determinations as a function of at least some of the previous variables. The method continues at step 128 where the processing module determines media content operational parameters for this user ID based on one or more of the profile of the digital media data object, stored media with a similar profile, the contents of the store data object message, a vault lookup, a command, a predetermination, a table lookup, a DSN records lookup, information about previously stored data objects, computing system status, and other determinations as a function of at least some of the previous variables.

The method continues at step 130 where the processing module dispersed storage error encodes the data object in accordance with the operational parameters to produce encoded data slices. In addition, the processing module may produce encoded key slices of encryption key(s) as previously discussed with reference to FIG. 6. In an example, the processing module partitions the data object into portions. The processing module encrypts each portion utilizing a unique random key to produce encrypted data, and dispersed storage error encodes the encrypted data to produce encoded data slices. The method continues at step 132 where the processing module sends the encoded data slices to a DSN memory for storage. The processing module encrypts the random key to produce an encrypted random key, dispersed storage error encodes the encrypted random key to produce encoded key slices, and sends the encoded key slices to the DSN memory for storage to enable subsequent retrieval and recovery of the data object.

In another example, the processing module partitions the data object into portions. The processing module determines which portions are new based on a profile of the portion compared to previously stored portions and portion profiles in the DSN memory. The processing module encrypts each new portion utilizing a unique random key and sends the encrypted data to the DSN memory for storage as encoded data slices. The processing module encrypts the profile ID of the similar profile utilizing a unique random key and sends the encrypted profile to the DSN memory for storage as encoded requester record slices. Note that this step may provide a memory utilization efficiency improvement. The processing module encrypts the random key and sends the encrypted random key to the DSN memory for storage as encoded key slices to enable subsequent retrieval and recovery of the data object.

At step 110, the processing module determines the profile of the software application when the processing module determines the digital content type of the data object as a software application. Note that the profile may characterize the data object in an efficient compact form much smaller than the data object. Such a determination may be based on one or more of a hash of the data object, the contents of the store data object message, a vault lookup, a command, a predetermination, a table lookup, a DSN records lookup, information about previously stored data objects, computing system status, and other determinations as a function of at least some of the previous variables. In an example, the processing module calculates a hash for at least a portion of the data object and determines the profile as the hash.

The method continues at step 112 where the processing module determines whether the user ID has favorable access rights to store the software application. Such a determination may be based on one or more of the DRM contents of the store data object message, other contents of the store data object message, a content provider query, a list of licensees for the software application, a product code provided by the user device, a DS managing unit query, a vault lookup, a command, a predetermination, a table lookup, a DSN records lookup, information about previously stored data objects, computing system status, and other determinations as a function of at least some of the previous variables. In an example, the processing module determines license credentials of the user device based on the DRM information and license requirements from a query of the software application provider. The processing module determines favorable access rights when the license credentials of the user ID do not prohibit access as indicated by the license requirements. The processing module determines unfavorable access rights when the license credentials of the user ID are not sufficient and/or are prohibited as indicated by the license requirements. The method branches to step 116 when the processing module determines that the user ID has favorable access rights to store the software application. The method continues to step 114 when the processing module determines that the user ID does not have favorable access rights to store the software application. The method ends at step 114 where the processing module sends an error message (e.g., to a DS managing unit and/or a user device).

The method continues at step 116 where the processing module determines stored software applications with a similar profile based on the profile of the received data object, a profile search of previously stored data objects, the contents of the store data object message, a vault lookup, a command, a predetermination, a table lookup, a DSN records lookup, information about previously stored data objects, computing system status, and/or other determinations as a function of at least some of the previous variables. The method continues at step 118 where the processing module determines software applications operational parameters for this user ID based on one or more of the profile of the software application data object, stored software applications with a similar profile, the contents of the store data object message, a vault lookup, a command, a predetermination, a table lookup, a DSN records lookup, information about previously stored data objects, computing system status, and other determinations as a function of at least some of the previous variables.

The method continues at step 120 where the processing module processes the data object and creates data segments and encoded data slices in accordance with the operational parameters. Note that slices may be produced for encryption key(s) and/or encrypted portions of the data object as previously discussed. In an example, the processing module partitions the data object into portions. The processing module encrypts each portion utilizing a unique random key to produce encrypted data, and dispersed storage error encodes the encrypted data to produce encoded data slices. The method continues at step 122 where the processing module sends the encoded data slices to the DSN memory for storage. The processing module encrypts the random key to produce an encrypted random key, dispersed storage error encodes the encrypted random key to produce encoded key slices, and sends the encoded key slices to the DSN memory for storage to enable subsequent retrieval and recovery of the data object.

In another example, the processing module partitions the data object into portions. The processing module determines which portions are new based on a profile of the portion compared to previously stored portions and portion profiles in the DSN memory. The processing module encrypts each new portion utilizing a unique random key to produce encrypted portions, dispersed storage error encodes encrypted portions to produce encoded data slices, and sends the encoded data slices to the DSN memory for storage. The processing module encrypts the profile ID of the similar profile utilizing a unique random key to produce an encrypted profile ID, dispersed storage error encodes the encrypted profile ID to produce encoded profile slices, and sends the encoded profile slices to the DSN memory for storage. Note that this step may provide a memory utilization efficiency improvement. The processing module encrypts the random key to produce an encrypted random key, dispersed storage error encodes the encrypted random key to produce encoded key slices, and sends the encoded key slices to the DSN memory for storage to enable subsequent retrieval and recovery of the data object.

Figure 8:
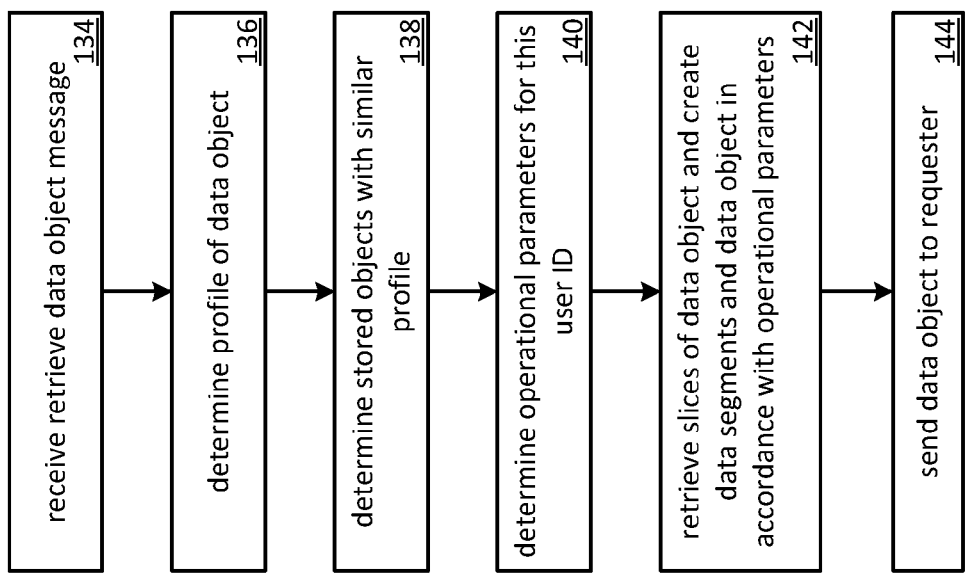
FIG. 8 is a flowchart illustrating an example of retrieving data in accordance with the invention.

FIG. 8 is a flowchart illustrating an example of retrieving data. The method begins with step 134 where a processing module receives a retrieve data object message discussed with reference to FIG. 6 from one of a user device, a DS processing unit, a storage integrity processing unit, a DS managing unit, and a DS unit. The method continues at step 136 where the processing module determines a profile of the data object. Note that the profile may characterize the data object in an efficient compact form much smaller than the data object. Such a determination may be based on one or more of a hash of the data object, contents of the retrieve data object message, a vault lookup, a command, a predetermination, a table lookup, a DSN records lookup, information about previously stored data objects, computing system status, and other determinations as a function of at least some of the previous variables. In an example, the processing module determines the profile as a received hash for at least a portion of the data object.

The method continues at step 138 where the processing module determines stored data objects with a similar profile. Such a determination may be based on the profile of the requested data object, a profile search of previously stored data objects, contents of the retrieve data object message, a vault lookup, a command, a predetermination, a table lookup, a DSN records lookup and search, information about previously stored data objects, computing system status, and/or other determinations as a function of at least some of the previous variables. The method continues at step 140 where the processing module determines operational parameters for this user ID based on one or more of the profile of the requested data object, stored media with a similar profile, the contents of the retrieve data object message, a vault lookup, a command, a predetermination, a table lookup, a DSN records lookup and/or search, information about previously stored data objects, computing system status, and other determinations as a function of at least some of the previous variables.

The method continues at step 142 where the processing module retrieves encoded data slices from the DSN memory in accordance with the operational parameters and the retrieval method. Note that encoded data slices may be retrieved that comprise encryption key(s) and/or encrypted portions of the data object as previously discussed with reference to FIG. 6. For example the processing module retrieves an encrypted random key from the DSN memory. The processing module retrieves encrypted data from the DSN memory that was encrypted utilizing the random key. The processing module decrypts the encrypted random key in accordance with the operational parameters and decrypts the encrypted data utilizing the random key to produce at least a portion of the data object. The processing module repeats the steps above to recreate each portion of the data object. The method continues at step 144 where the processing module sends the data object to the requester (e.g., the user device).

In another example, the processing module retrieves an encrypted random key from the DSN memory and the processing module retrieves encrypted data from the DSN memory that was encrypted utilizing the random key. The processing module decrypts the encrypted random key in accordance with the operational parameters and decrypts the encrypted data utilizing the random key to produce data where the data may include at least a portion of the data object or a profile number. The processing module retrieves further encrypted data that is referenced by the profile (e.g., the profile may point to a DSN address of the further encrypted data). The processing module decrypts the further encrypted data utilizing the random key to produce data where the data may include at least a portion of the data object. Note that the profile entry may provide a memory utilization efficiency improvement. The processing module repeats the steps above to recreate each portion of the data object. The processing module sends the data object to the requester (e.g., the user device).

Figure 9:
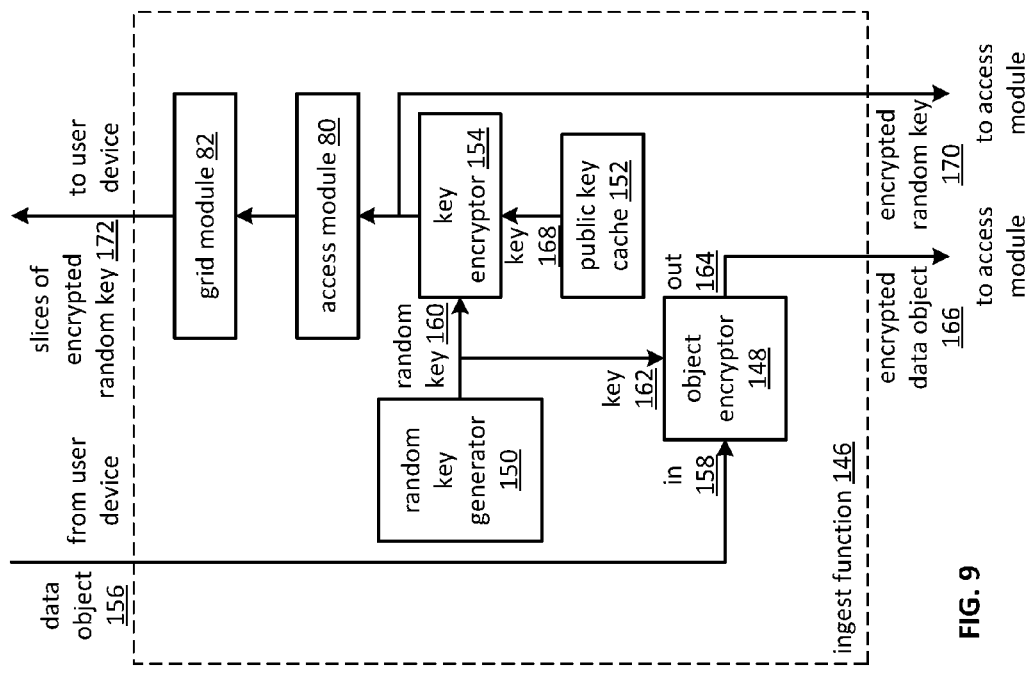
FIG. 9 is a schematic block diagram of an embodiment of an ingest function in accordance with the invention.

FIG. 9 is a schematic block diagram of an embodiment of an ingest function 146. As illustrated, the ingest function 146 includes a random key generator 150, an object encryptor 148, a public key cache 152, a key encryptor 154, an access module 80, and a grid module 82. The random key generator 150 generates a random key 160 based on one or more of a random number seed, a predetermined seed, a seed as a function of a portion of the store data object request, a command, a vault lookup, a security indicator, and a message. In an example of operation, the object encryptor 148 selects a portion of a data object 156 as an input 158 and encrypts the portion using the random key 160 as a key 162 in accordance with operational parameters (e.g., encryption algorithm type) to produce an encrypted data object 166 as an output 164. The public key cache 152 stores public keys (e.g., of private/public key pairs) of one or more of a system, one or more of a plurality of user devices, a dispersed storage (DS) processing unit, a dispersed storage network (DSN) memory, a plurality of DS units, a DS managing unit, and a storage integrity processing unit. The public key cache 152 provides a key 168 as an output. The key encryptor 154 encrypts the random key 160 as an input using the key 168 in accordance with the operational parameters (e.g., encryption algorithm type). The access module 80 operates as previously discussed to produce data segments. The grid module 82 operates as previously discussed to produce encoded data slices based on the data segments.

In an example of operation, the ingest function 146 receives a store data object message from a user device as discussed previously. The random key generator 150 produces the random key 160. The object encryptor 148 selects at least a portion of the data object 156 from the user device in accordance with the operational parameters. For instance, the portion may be a data segment. The object encryptor 148 encrypts the portion of a data object utilizing the random key 160 to produce an encrypted data object portion 166. The object encryptor 148 sends the encrypted data object portion 166 to the access module of a DS processing for storage in a DSN memory.

In the example of operation continued, the key encryptor 154 encrypts the random key 160 from the random key generator 150 utilizing the public key 168 from the public key cache 152 for the system in accordance with the operational parameters to produce an encrypted random key 170. The key encryptor 154 sends the encrypted random key 170 to the access module of the DS processing for storage in the DSN memory. The key encryptor 154 encrypts the random key 160 from the random key generator 150 utilizing a public key for the user device in accordance with the operational parameters to produce an encrypted random key. The key encryptor 154 sends the encrypted random key to the access module 80 to produce data segments in accordance with the operational parameters as previously discussed. The access module 80 sends the data segments to the grid module 82 to produce encoded encoded key slices in accordance with the operational parameters as previously discussed. The grid module 82 sends the encoded key slices to the user device for storage as slices of encrypted random key 172 to enable subsequent direct retrievals of the data object by the user device.

Figure 10:
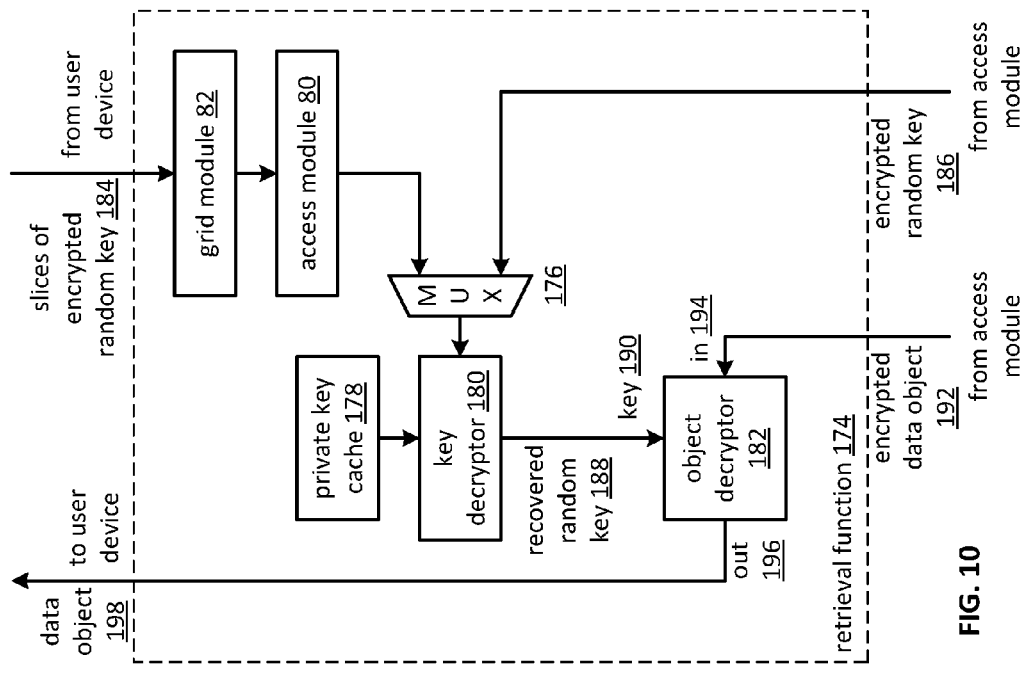
FIG. 10 is a schematic block diagram of an embodiment of a retrieval function in accordance with the invention.

FIG. 10 is a schematic block diagram of an embodiment of a retrieval function 174. As illustrated, the retrieval function 174 includes a private key cache 178, a key decryptor 180, a multiplexer (MUX) 176, an access module 80, a grid module 82, and an object decryptor 182. The object decryptor 182 may receive an encrypted portion of a data object 192 as an input 194 which it decrypts using a recovered random key 188 as a key 190 in accordance with the operational parameters (e.g., decryption algorithm type) to produce a data object 198 as an output 196. The private key cache 178 locally stores private keys (e.g., of private/public key pairs) of one or more of the system, one or more of a plurality of user devices, a dispersed storage (DS) processing unit, a dispersed storage network (DSN) memory, a plurality of DS units, a DS managing unit, and a storage integrity processing unit. The key decryptor 180 decrypts the output of the MUX 176 in accordance with the operational parameters (e.g., encryption algorithm type) to produce an encrypted key. The grid module 82 operates as previously discussed to de-slice and decode encoded key slices 184 to produce data segments. The access module 80 operates as previously discussed to aggregate data segments into the keys (e.g., the encrypted random key). The MUX 176 selects one of two sources for providing the encrypted random key to the key decryptor.

In an example of operation, the retrieval function 174 receives a retrieve data object message from a user device and determines where to retrieve the encrypted data object 192 and encrypted random key 186 based on contents of the retrieve data object message and/or the operational parameters. The retrieval function 174 may retrieve the encrypted random key from the user device and/or the DSN memory (e.g., via the access module of the DS processing unit) based on availability and/or the operational parameters. In an example, grid module 82 retrieves the slices of encrypted random key 184 as encoded key slices when the retrieval function determines to utilize the user device. The grid module 82 de-slices and decodes the retrieved encoded key slices in accordance with the operational parameters to produce data segments. The grid module 82 sends the data segments to the access module 80 where the access module 80 aggregates the data segments in accordance with the operational parameters to produce the encrypted random key. The access module sends the encrypted random key to the MUX 176. The retrieval function 174 controls the MUX 176 to send the encrypted random key to the key decryptor 180. In another example, the retrieval function 174 retrieves the encrypted random key 186 at the MUX 176 from the access module of a DS processing unit when the retrieval function 174 determines to utilize the DS processing unit. The retrieval function 174 controls the MUX 176 to send the encrypted random key 186 to the key decryptor 180.

In the example of operation continued, the key decryptor 180 receives the private key for the user from the private key cache 178 when the retrieval function determines to utilize the user device. The key decryptor 180 receives the private key for the system from the private key cache 178 when the retrieval function determines to utilize the DS processing unit. The key decryptor 180 decrypts the encrypted random key utilizing the private key in accordance with the operational parameters to produce a recovered random key 188. The key decryptor 180 sends the recovered random key 188 to the object decryptor 182 as the key 190.

In the example of operation continued, the retrieval function 174 retrieves at least a portion of the data object as an encrypted data object 192 from the DSN memory via the access module of the DS processing unit in accordance with the operational parameters. The object decryptor 182 receives the at least a portion of the data object as an input 194 and decrypts the at least a portion of the data object utilizing the recovered random key 188 in accordance with the operational parameters to produce at least a portion of the data object 198 as an output 196. The object decryptor 182 may continue the above steps to produce substantially all of the portions of the data object 198. The object decryptor 182 may aggregate the portions of the data object to produce the data object 198. The object decryptor 182 sends the data object 198 to the user device.

Figures 11, 12:
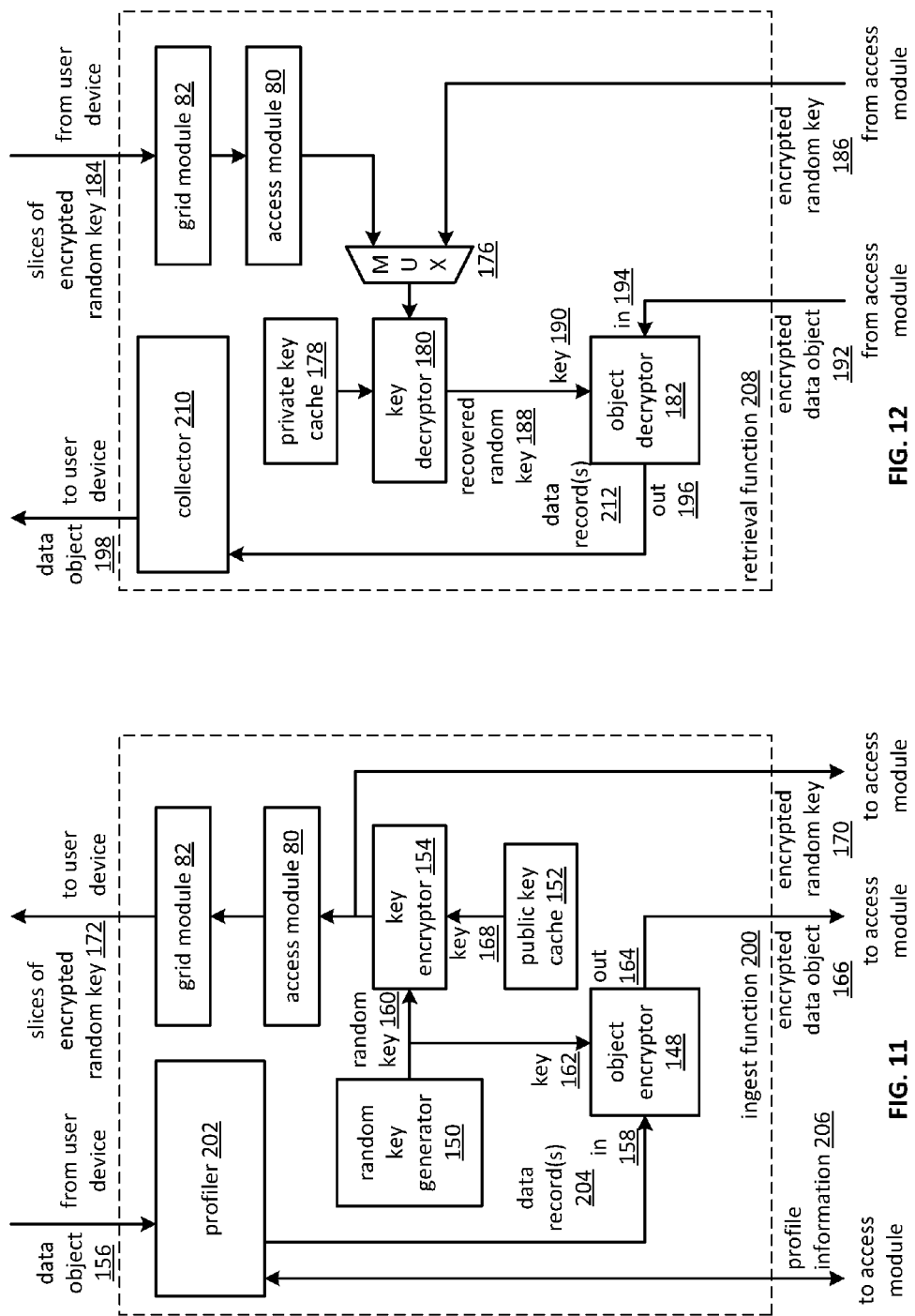
FIG. 11 is another schematic block diagram of an embodiment of another ingest function in accordance with the invention.
FIG. 12 is another schematic block diagram of an embodiment of another retrieval function in accordance with the invention.

FIG. 11 is another schematic block diagram of another embodiment of an ingest function 200. As illustrated, the ingest function 200 includes a random key generator 150, a profiler 202, an object encryptor 148, a public key cache 152, a key encryptor 154, an access module 80, and a grid module 82. The random key generator 150, the public key cache 152, the key encryptor 154, the access module 80, and the grid module 82 operate as previously discussed with reference to FIG. 9. The profiler 202 selects a portion of a data object 156 and determines a profile of the portion. The profiler 202 compares the profile to profiles of previously stored data object portions. The profiler 202 saves new profiles. The profiler 202 produces a data record based in part on the comparison results, the profile, and the data object portion. The profiler 202 sends data records 204 to the object encryptor 148. The object encryptor 148 encrypts an input 158 using a key 162 in accordance with the operational parameters (e.g., encryption algorithm type) to produce an output 164.

In an example of operation, the ingest function 200 receives a store data object message from a user device as previously discussed. The profiler 202 selects at least a portion of the data object 156 from the user device in accordance with operational parameters. In an example, the portion is a data segment. The profiler 202 determines a profile of the portion where the profile may characterize the data object 156 in an efficient compact form much smaller than the data object. Such a determination may be based on one or more of a hash of the data object, the contents of the store data object message, a vault lookup, a command, a predetermination, a table lookup, a DSN records lookup, information about previously stored data objects, computing system status, and other determinations as a function of at least some of the previous variables. For instance, the profiler 202 calculates a hash of at least a portion of the data object 156 as the profile.

In the example of operation continued, the profiler 202 determines stored data object(s) with a similar profile based on the profile of the received data object portion, a profile search of previously stored data objects, contents of the store data object message, a vault lookup, a command, a predetermination, a table lookup, a DSN records lookup, information about previously stored data objects, computing system status, and other determinations as a function of at least some of the previous variables. The profiler 202 sends new profiles and a profile number (e.g., an identifier) of the new profile to the access module of a DS processing to save the profile in a DSN memory as profile information 206 when the profiler 202 determines there are no similar profiles.

In the example of operation continued, the profiler 202 produces at least one data record based in part on the comparison results, the profile, and the data object portion. For instance, the profiler produces a first data record 204 to include the profile number of the new profile and the data object portion and the profiler produces a second data record 204 to include the profile number of the new profile when the profiler determines there are no similar profiles based in part on the comparison. In another instance, the profiler 202 produces a data record 204 to include the profile number of the existing similar profile when the profiler 202 determines there is a similar profile based in part on the comparison. The profiler 202 sends the data record 204 to the object encryptor 148. The object encryptor 148 encrypts the data record(s) 204 received from the profiler 202 utilizing the random key 160 to produce an encrypted data object portion 166. The object encryptor 148 sends the encrypted data object portion to the access module of the DS processing for storage in the DSN memory as the encrypted data object 166.

In the example of operation continued, the key encryptor 154 encrypts the random key 160 from the random key generator 150 utilizing the public key 168 from the public key cache 152 for the system in accordance with the operational parameters to produce an encrypted random key. The key encryptor 154 sends the encrypted random key 170 to the access module of the DS processing for storage in the DSN memory. The key encryptor 154 encrypts the random key 160 from the random key generator 150 utilizing a public key for the user device in accordance with the operational parameters to produce an encrypted random key. The key encryptor 154 sends the encrypted random key to the access module 80 to produce data segments in accordance with the operational parameters as previously discussed. The access module 80 sends the data segments to the grid module 82 to produce encoded key slices in accordance with the operational parameters as previously discussed. The grid module 82 sends the encoded key slices to a user device as slices of the encrypted random key 172 for storage to enable subsequent direct retrievals of the data object by the user device.

FIG. 12 is another schematic block diagram of another embodiment of a retrieval function 208. As illustrated, the retrieval function 208 includes a private key cache 178, a key decryptor 180, a multiplexer (MUX) 176, an access module 80, a grid module 82, an object decryptor 182, and a collector 210. The private key cache 178, the key decryptor 180, the multiplexer (MUX) 176, the access module 80, and the grid module 82 operate as previously discussed with reference to FIG. 10. The object decryptor 182 receives an encrypted portion of the data object 192 and decrypts the encrypted data object 192 using a key 190 in accordance with operational parameters (e.g., decryption algorithm type). The object decryptor 182 sends data records 212 as an output 196 to the collector 210. The collector 210 aggregates portions of the retrieved data object to reproduce the requested data object. The collector 210 sends the data object 198 to a user device that requested the data object.

In an example of operation, the retrieval function 208 receives a retrieve data object message from a user device and determines where to retrieve the encrypted data object 192 and encrypted random key 186 based on the contents of the retrieve data object message and/or the operational parameters. The retrieval function 208 may retrieve the encrypted random key from the user device and/or a dispersed storage network (DSN) memory (e.g., via the access module of the dispersed storage (DS) processing unit) based on availability and/or the operational parameters. In an example, the grid module 82 retrieves encoded key slices of the encrypted random key 184 when the retrieval function determines to utilize the user device. The grid module 82 de-slices and decodes the retrieved encoded key slices in accordance with operational parameters to produce data segments. The grid module 82 sends the data segments to the access module 80. The access module 80 aggregates the data segments in accordance with the operational parameters to produce the encrypted random key. The access module 80 sends the encrypted random key to the MUX 176. The retrieval function 208 controls the MUX 176 to send the encrypted random key to the key decryptor 180.

In another example, the retrieval function 208 retrieves the encrypted random key 186 at the MUX 176 from the access module of the DS processing unit when the retrieval function determines to utilize the DS processing unit. The retrieval function 208 controls the MUX 176 to send the encrypted random key to the key decryptor 180. The key decryptor 180 receives the private key for the user from the private key cache 178 when the retrieval function determines to utilize the user device. The key decryptor 180 receives the private key for the system from the private key cache 178 when the retrieval function determines to utilize the DS processing unit. The key decryptor 180 decrypts the encrypted random key utilizing the private key in accordance with the operational parameters to produce a recovered random key 188. The key decryptor 180 sends the recovered random key 180 to the object decryptor 182.

In the example of operation continued, the retrieval function retrieves at least a portion of the data object as an encrypted data object 192 from the DSN memory via the access module of the DS processing unit in accordance with the operational parameters. The object decryptor 182 receives the at least a portion of the data object and decrypts the at least a portion of the data object utilizing the recovered random key 188 as the key 190 in accordance with the operational parameters to produce a data record 212. The object decryptor 182 sends the data record 212 to the collector 210.

In the example of operation continued, the collector 210 receives the data record 212 and determines the contents which includes a profile number and may include a portion of the data object. The collector holds the portion of the data object when the collector 210 determines that the data record includes a portion of the data object. The collector 210 determines a DSN address of a corresponding portion of the data object when the collector 210 determines that the data record does not include a portion of the data object. Such a determination of the DSN address may be based on one or more of a profile table lookup (e.g., containing profile number, profile, DSN address of portion), operational parameters, user ID, directory lookup, a DSN data record lookup, and information from the retrieve data object message. The collector 210 sends a retrieval request to the access module of the DS processing that includes the DSN address. The object decryptor 182 receives the portion of the data object in response. The object decryptor 182 decrypts the portion of the data object utilizing the recovered random key 188 in accordance with the operational parameters to produce a data record 212 that contains a portion of the data object. The object decryptor 182 sends the portion of the data object to the collector 210. The collector 210 receives the portion of the data object and holds the portion of the data object. The object decryptor 182 and collector 210 may continue the above steps to produce substantially all of the portions of the data object. The collector 210 may aggregate the held portions of the data object to produce the data object 198. The collector 210 sends the data object 198 to the user device.

Figure 13:
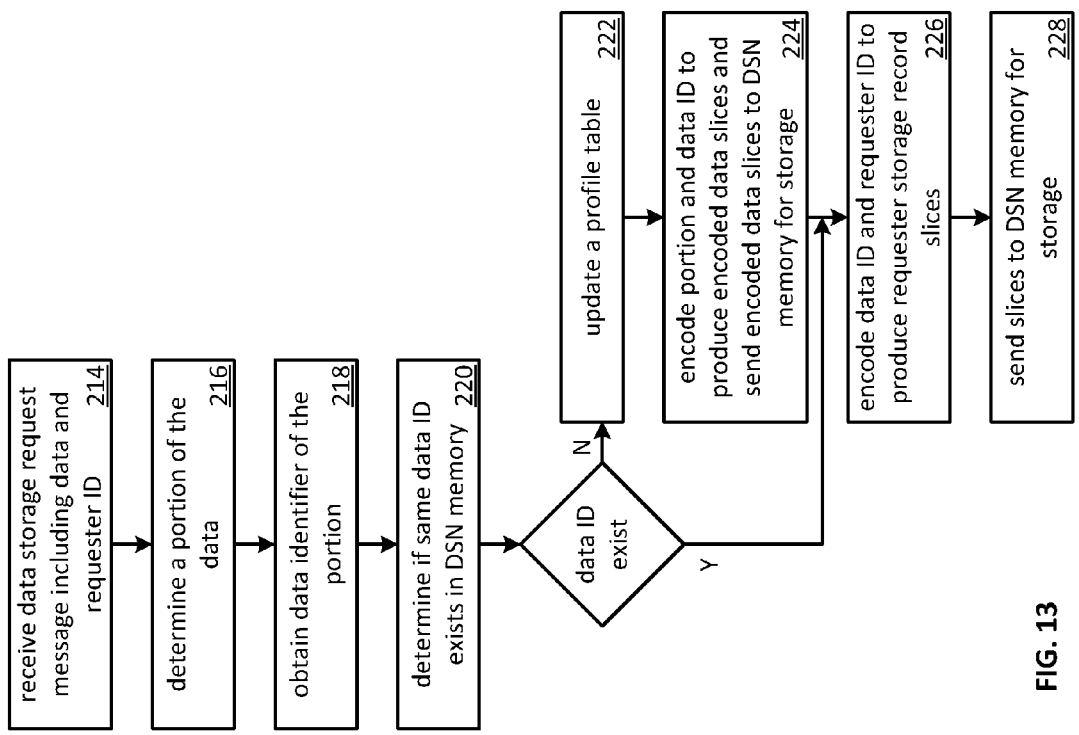
FIG. 13 is a flowchart illustrating an example of profiling data in accordance with the invention.

FIG. 13 is a flowchart illustrating an example of profiling data. The method begins with step 214 where a processing module (e.g., of an ingest function) receives a plurality of data storage requests from a plurality of requesting devices regarding storage of data. Each data storage request of the plurality of data storage requests may include one or more of the data, a requester identifier (ID) of a corresponding one of the plurality of requesting devices, a data object name, a data object hash, digital rights management information, a data size indicator, a data type indicator, a priority indicator, security indicator, and a performance indicator. The method continues at step 216 where the processing module determines at least a data portion of the data based on one or more of operational parameters, a predetermination, a vault lookup, and information included in the data storage request. In an example, the processing module determines the portion to be a data segment based on a vault lookup corresponding to the requester ID.

The method continues at step 218 where the processing module obtains a data identifier (ID) for the data. Such obtaining may be based on one or more of generating a calculated hash of the data, generating a calculated hash of the data portion, retrieving the data ID from a profile table based on the calculated hash, receiving the data ID from the requester, a vault lookup, a command, a predetermination, a table lookup, information about previously stored data, a computing system status indicator. In an example, the processing module obtains the data ID based on calculating the calculated hash of the data. The method continues at step 220 processing module determines, from data storage request to data storage request of the plurality of data storage requests, whether the data is substantially the same. Such a determination may be based on one or more of determining whether a first data ID associated with the data of a first data storage request of the plurality of data storage requests substantially matches a second data ID associated with the data of a second data storage request of the plurality of data storage requests, determining whether a first hash of the data of the first data storage request substantially matches a second hash of the data of the second data storage request, and comparing the data of the first data storage request with the data of the second data storage request. In an example, the processing module determines that the data is substantially the same when the first data ID associated with the data of the first data storage request substantially matches the second data ID associated with the data of a second data storage request.

The method branches to step 226 when the processing module determines that the data is substantially the same. The method continues to step 222 when the processing module determines that the data is not substantially the same. The method continues at step 222 where the processing module updates a profile table with a new profile record including profile information. In an example, the profile record includes a data ID, a profile number (e.g., a unique identifier), a profile (e.g., a data descriptor and/or a hash of the data), and a dispersed storage network (DSN) address of where the data will be stored in a dispersed storage network (DSN) memory. The processing module saves the updated profile table. For instance, the processing module saves the updated profile table in a local memory. In another instance, the processing module dispersed error encodes the updated profile table to create profile table slices and sends the profile table slices to the DSN memory for storage therein.

The method continues at step 224 where the processing module selects one of the plurality of data storage requests. Such a selection may be based on one or more of an ordering of receipt of the plurality of data storage requests, the requester ID identifying a particular de-duplication authorization level, a type of the data, a size of the data, and number of the plurality of data storage requests. In an example, the processing module selects the first data storage request based on the type of data. In another example, the processing module selects the 100th data storage request based on the number of the plurality of data storage requests. The processing module dispersed storage error encodes at least a portion of the data from one of the plurality of data storage requests (e.g., the selected one) to produce a set of encoded data slices. The processing module sends the set of encoded data slices to the DSN memory for storage therein.

Alternatively, or in addition to, the processing module may encode at least one of the portion of the data and the data ID using an error coding dispersal storage function to produce the set of encoded data slices. Alternatively, or in addition to, the processing module may encrypt at least one of the portion of the data and the data ID using a random encryption key to produce encrypted data. The processing module encodes the encrypted data using the error coding dispersal storage function to produce the set of encoded data slices. The processing module sends the set of encoded data slices to the DSN memory for storage therein. The processing module encrypts the random encryption key using a public key (e.g., associated with the requester ID and/or associated with a dispersed storage network) to produce an encrypted random encryption key and dispersed storage error encodes the encrypted random encryption key to produce a set of encoded key slices. The processing module sends the set of encoded key slices to the DSN memory for storage therein.

The method continues at step 226 where the processing module, for each of the plurality of data storage requests, combines the data ID and the requester ID to produce a requester storage record. The processing module dispersed storage error encodes the requester storage record to produce a set of encoded requester storage record slices. In an example, such combining of the data ID and the requester ID includes selecting at least one of the data ID and the requester ID as the requester storage record. Alternatively, or in addition to, the processing module may encrypt at least one of the data ID and the requester ID using a random encryption key to produce the requester storage record. The processing module encrypts the random encryption key using a public key (e.g., associated with the requester ID and/or associated with a dispersed storage network) to produce an encrypted random encryption key. The processing module dispersed storage error encodes the encrypted random encryption key to produce a set of encoded key slices. The processing module sends the set of encoded key slices to the DSN memory for storage therein. The method continues at step 228 where the processing module sends the set of encoded requester storage record slices to the DSN memory for storage therein.

FIG. 14 is a table illustrating an example of a profile table 230. In an example, the profile table 230 is utilized by an ingest function and retrieval function to track where new data object portions are stored in a dispersed storage network (DSN) memory. As illustrated, the profile table 230 includes a profile number field 232, a profile field 234, and a DSN address of system data records field 236. Note that the profile number is a reference to the profile and the DSN address of the system data record refers to the address where encoded data slices are stored corresponding to the profile.

As illustrated, profile number 1 has a profile value of 101 and the corresponding data portion is stored at DSN address 707. Profile number 2 has a profile value of 202 and the corresponding data portion is stored at DSN address 901. A profiler may search for similar profiles by searching through the profile field 234. The profiler obtains the profile number from the profile number field 232 and a DSN address from the DSN address of the system data record field 236 of the data portion when a match is found.

FIG. 15 is a table illustrating an example of dispersed storage network (DSN) data records 238. In an example, the DSN data records 238 are utilized by an ingest function and a retrieval function to store and retrieve DSN data records that includes new data object portions and profile numbers. As illustrated, the DSN data records 238 includes a DSN address field 240, a user identifier (ID) field 242, a profile number field 244, and a data portion field 246. Note that the data portion field of the data record may be empty when the data record is utilized to point to a profile table entry that contains the DSN address of the data portion. Note that the data records may be encrypted with a random key where the random key may be unique for each data record.

As illustrated, the DSN memory data record at DSN address 707 includes a user ID of 0, a profile number of 1, and a non-zero data portion field (e.g., the actual data portion for profile 1). Note that in the example, user ID of 0 denotes the system ID while the user ID 1 and user ID 2 denotes the user device 1 ID and user device 2 ID. The DSN memory data record at DSN address 901 includes a user ID of 0, a profile number of 2, and a non-zero data portion field (e.g., the actual data portion for profile 2). Note that the DSN addresses of the profile table link to these first two data records. For example, the retrieval function may access the profile table to identify profile 2 and link to the data record address 901 to retrieve the data portion 73092f3a9c0 . . . . The DSN memory data record at DSN address 706 includes a user ID of 1, a profile number of 1, and a zero data portion field (e.g., since this data record may be utilized in a sequence of steps where the next step is to access the profile table based on the profile number to determine the DSN address of the data record that contains the data portion of the profile). The DSN memory data record at DSN address 1101 includes a user ID of 1, a profile number of 2, and a zero data portion field. The DSN memory data record at DSN address 1010 includes a user ID of 2, a profile number of 1, and a zero data portion field. Note that this may indicate that user 2 has also previously stored the substantially identical data portion (e.g., of profile 1) as user device 1 which is stored at DSN address 707. The DSN memory data record at DSN address 1020 includes a user ID of 2, a profile number of 2, and a zero data portion field. Note that this may indicate that user 2 has also previously stored the substantially identical data portion (e.g., of profile 2) as user device 1 which is stored at DSN address 901.

FIG. 16 is a table illustrating an example of dispersed storage network (DSN) key records 248. The DSN key records 248 may be utilized by an ingest function and retrieval function to store and retrieve DSN key records. As illustrated, the DSN key records 248 includes a DSN address field 250, a user ID field 252, a profile number field 254, and a key field 256. In an example, the key field 256 is utilized to store a random key that was utilized to encrypt a corresponding data record (e.g., corresponding to the profile number). Note that the key records may be encrypted with a public key associated with the user ID.

As illustrated, the DSN memory key record at DSN address 601 includes a user ID of 0, a profile number of 1, and a key in the key field. In an example of operation, the retrieval function of the system may decrypt this record utilizing the private key of the system exposing the profile number and the random key utilized to encrypt the data record for profile 1. The retrieval function may determine the DSN address of the data record (e.g., 707) based on utilizing the profile number 1 in a profile table lookup. Next, the retrieval function may retrieve the data record and decrypt it utilizing the random key recovered from the key record exposing the data portion.

As illustrated, the DSN memory key record at DSN address 602 includes a user ID of 0, a profile number of 2, and a key in the key field 256. The key record at DSN address 600 includes a user ID of 1, a profile number of 1, and a key in the key field 256. In an example of operation, the retrieval function of the system and/or user device may decrypt this record utilizing the private key of user device 1 exposing the profile number and the random key utilized to encrypt the user 1 data record for profile 1. The retrieval function may determine the DSN address of the data record (e.g., 706) based on utilizing the profile number 1 in a directory lookup (e.g., discussed in greater detail below with reference to FIG. 17). Next, the retrieval function may retrieve the data record at DSN address 706 and decrypt it utilizing the random key recovered from the key record exposing the data record. The retrieval function determines that the data portion is empty in the data record indicating that the data portion is in another data record corresponding to the profile number. The retrieval function may determine the DSN address of the data record (e.g., 707) contain the data portion based on utilizing the profile number 1 in a profile table lookup. Next, the retrieval function may retrieve the data record from DSN address 707 and decrypt it utilizing the random key recovered from the user 0 key record at DSN address 601 exposing the data portion.

FIG. 17 is a table illustrating an example of a dispersed storage network (DSN) directory 258. Such a DSN directory 258 may be utilized by an ingest function and a retrieval function to store and retrieve data records and/or key records that includes a user identity (ID), a data object ID, a profile number, a user data address (e.g., a DSN address of a data record for a user device), a user key address (e.g., a DSN address of a key record for a user device), a system data address (e.g., a DSN address of a data record for a system), and a system key address (e.g., the DSN address of the key record for the system). As illustrated, the DSN directory 258 includes a user ID field 260, a data object ID field 262, a profile number field 264, a user device address field 266, a user key address field 268, a system data address field 270, and a system key address field 272.

As illustrated, the first DSN directory record for user 0 includes a user ID of 0, a data object ID of foo, a profile number of 1, a user data address of 707, a user key address of 601, a system data address of 707, and a system key address of 601. In an example of operation, the retrieval function desires to retrieve a first portion of the file foo. The retrieval function determines that the system key is at DSN address 601 and the system data record is at DSN address 707. The retrieval function retrieves the key record at DSN address 601 and decrypts the record utilizing the system private key exposing the random key. The retrieval function retrieves the data record at DSN address 707 and decrypts the record utilizing the random key exposing the data portion.

As illustrated, the last DSN directory record for user 2 includes a user ID of 2, a data object ID of foo, a profile number of 2, a user data address of 1020, a user key address of 939, a system data address of 901, and a system key address of 602. In an example of operation, the retrieval function desires to retrieve a second portion of the file foo. The retrieval function determines that the system key is at DSN address 602 and the system data record is at DSN address 901. The retrieval function retrieves the key record at DSN address 602 and decrypts the record utilizing the system private key exposing the random key. The retrieval function retrieves the data record at DSN address 901 and decrypts the record utilizing the random key exposing the data portion.

In another example of operation, user device 2 desires to retrieve a second portion of the file foo. The retrieval function of user device 2 may have limited access to the DSN directory such that user device 2 may only determine that the user 2 key is at DSN address 939 and the user 2 data record is at DSN address 1020. The user device 2 retrieves the key record at DSN address 939 and decrypts the record utilizing the user 2 private key exposing a random key. The user device 2 retrieves the data record at DSN address 1020 and decrypts the record utilizing the random key exposing the data portion. The user device 2 determines the profile number 2 since the data portion is empty. The user device 2 determines that the data record address is 901 based on a profile table lookup for profile number 2. The user device 2 sends a request for the contents of the data record at DSN address 901 to the retrieval function of the system. Note that the requests and responses between the user devices and the DS processing unit may be communicated utilizing public key/private key pairs. The retrieval function of the system retrieves the data record at DSN address 901 and decrypts it utilizing the system private key to expose the data portion. The retrieval function of the system sends the data portion to the user device 2.

In another example, a data record containing the data portion is encrypted with a random key that is encrypted utilizing a public key of a user device (e.g., when the data is initially stored by the same user device). In this instance, the same random key is utilized to encrypt the data record associated with the system and the data record associated with the user device. This enables the user device to subsequently retrieve the data object portion with little assistance (e.g., use of system keys) by a dispersed storage (DS) processing unit.

Figure 18:
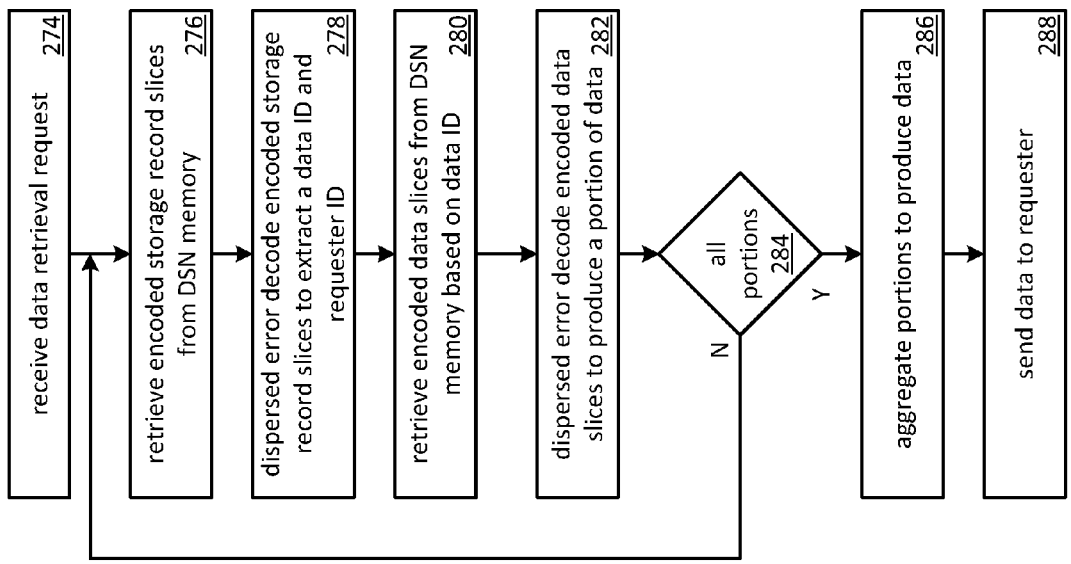
FIG. 18 is another flowchart illustrating another example of retrieving data in accordance with the invention.

FIG. 18 is another flowchart illustrating another example of retrieving data. The method begins with step 274 where a processing module (e.g., of a retrieval function) receives a plurality of data retrieval requests from a plurality of requesting devices to retrieve de-duplicated stored data. In an example, a data retrieval request of the plurality of data retrieval requests includes a requester storage record identifier (ID), a user ID, a data object name, a data object hash, digital rights management information, a data size indicator, a data type indicator, a priority indicator, a security indicator, and a performance indicator. The method continues at step 276 where the processing module, for each of the plurality of data retrieval requests, retrieves a set of encoded requester storage record slices from a dispersed storage network (DSN) memory based on one or more of the requester storage record ID, operational parameters, and a table lookup. In an example, the processing module utilizes the requester storage record ID as an index into a DSN data records table to obtain a DSN memory location to retrieve the encoded requester storage record slices.

The method continues at step 278 where the processing module dispersed storage error decodes the set of encoded requester storage record slices to reproduce a requester storage record. Alternatively, or in addition to, the processing module may retrieve a set of encoded key slices from the DSN memory and dispersed storage error decode the set of encoded key slices to produce an encrypted random encryption key. The processing module decrypts the encrypted random encryption key using a private key (e.g., associated with a user and/or the dispersed storage network) to produce a random encryption key. The processing module dispersed storage error decodes the set of encoded requester storage record to produce an encrypted requester storage record and decrypts the encrypted requester storage record using the random encryption key to produce the requester storage record. The method continues where the processing module extracts a data identifier (ID) and a requester identifier (ID) from the requester storage record. In addition, the processing module may verify the requester ID extracted from the requester storage record with a requester device provided requester ID, when the data retrieval request further includes the requester device provided requester ID. The processing module verifies the requester ID when the requester ID extracted from the requester storage record is substantially the same as the requester device provided requester ID.

The method continues at step 280 where the processing module retrieves a set of encoded data slices from the DSN memory based on the data ID of one of the plurality of data retrieval requests. In an example, the processing module utilizes the data ID as an index into a profile table and/or a DSN data records table to obtain a DSN address of the storage location to retrieve set of encoded data slices. The method continues at step 282 where the processing module dispersed storage error decodes the set of encoded data slices to reproduce at least a portion of the de-duplicated stored data. Alternatively, or in addition to, the processing module may retrieve a set of encoded key slices from the DSN memory and dispersed storage error decode the set of encoded key slices to produce an encrypted random encryption key. The processing module decrypts the encrypted random encryption key using a private key (e.g., associated with a user and/or the dispersed storage network) to produce a random encryption key. The processing module dispersed storage error decodes the plurality of encoded data slices to produce a plurality of encrypted data segments, decrypting each of the plurality of encrypted data segments using the random encryption key to produce the at least a portion of the de-duplicated stored data.

The method continues at step 284 where the processing module determines whether all portions of the data have been produced based on comparing a number of portions produced to a number of portions of the data. The method repeats back to step 276 the processing module determines that all portions of the data have not been produced. The method continues to step 286 when the processing module determines that all portions of the data have been produced. The method continues at step 286 where the processing module aggregates the portions to produce the data. The method continues at step 288 where the processing module sends the data to the requesting device.

FIG. 19 is another schematic block diagram of an embodiment of another ingest function 290. As illustrated, the ingest function 290 includes a key generator 292, a key reference generator 294, a key reference profiler 296, a multiplexer (MUX) 298, a key information compressor 300, an object encryptor 148, and a data compressor 302. In an example of operation, the key generator 292 generates a key A based in part on at least a portion of a data object 156. For instance, key A is substantially the same as the portion of the data object. The key reference generator 294 produces a key reference based in part on key A. For instance, the key reference is a hash of key A. The key reference profiler 296 determines if a similar key reference has been stored in a dispersed storage network (DSN) memory and saves the key reference in the DSN memory as key reference information 308 when the key reference profiler 296 determines that a similar key reference has not been previously stored in the DSN memory. The MUX 298 receives control information from the key reference profiler 296 and sends the key A and/or key reference to the key info compressor 300 based on the control information. The MUX 298 sends both the key A and key reference to the key info compressor 300 when the key reference is not found in the DSN memory. The MUX 298 sends the key reference to the key info compressor 300 when the key reference is found in the DSN memory. The key info compressor 300 compresses the key A and/or key reference to reduce the memory storage requirements. The key info compressor 300 sends the compressed key A and/or key reference as key information 306 to the access module of a dispersed storage (DS) processing unit to create encoded key slices and store the slices in the DSN memory.

In an example of operation, the key generator 292 may produce a key B based in part on key A and/or at least a portion of the data object. For instance, key B is substantially the same as key A. The object encryptor 148 encrypts the at least a portion of the data object 156 as an input 158 using key B as a key 162 in accordance with the operational parameters (e.g., encryption algorithm type) to produce an encrypted portion of the data object as an output 164. The data compressor 302 compresses the encrypted portion of the data object to produce an encrypted data portion 304. The data compressor 302 sends the compressed encrypted portion 304 of the data object as an encrypted data portion to the access module of a dispersed storage (DS) processing unit to create encoded data slices and store the slices in the DSN memory.

In another example of operation, the ingest function 290 receives a store data object message from a user device as discussed previously. The ingest function 290 determines operational parameters based on one or more of a user ID, a data object name, contents of the store data object message, a vault lookup, a command, a predetermination, a table lookup, information about previously stored data objects, computing system status, and other determinations as a function of at least some of the previous variables. The key generator 292 selects at least a portion of the data object and generates the key A based in part on the portion of the data object and the operational parameters. For instance, key A is substantially the same as the portion of the data object. In another instance, key A is substantially an inverted portion of the data object. In yet another instance, key A is substantially the same as the portion of the data object except for n bits which are different. In yet another instance, key A is substantially an inverted portion of the data object except for m bits.

The key reference generator 294 produces a key reference based in part on key A. For instance, the key reference is a hash of key A. The key reference profiler 296 determines if a similar key reference has been stored in the DSN memory based on a search of the key reference information stored in the DSN memory and a comparison of the key reference profile to the stored key reference profiles of the search. The key reference profiler 296 sends the key reference and the DSN address of where the key information will be stored to the access module of the DS processing unit to store the key reference and DSN address in the DSN memory as key reference information 308 when the key reference profiler 296 determines that a similar key reference has not been previously stored in the DSN memory.

The MUX 298 receives control information from the key reference profiler 296 and sends the key A and/or key reference to the key info compressor 300 based on the control information. The MUX 298 sends both the key A and key reference to the key info compressor 300 when the key reference is not found in the DSN memory. The MUX 298 sends the key reference to the key info compressor 300 when the key reference is found in the DSN memory. The key info compressor 300 compresses the key A and/or key reference to reduce the memory storage requirements. The key info compressor 300 sends the compressed key A and/or key reference as key information 306 to the access module of the DS processing unit to create encoded key slices and store the slices in the DSN memory.

In the example of operation continued, the key generator 292 produces a key B based in part on key A and/or at least a portion of the data object 156. For instance, key B is substantially the same as key A. In another instance, key B is substantially an inverted key A. In yet another instance, key B is substantially the same as key A except for n bits which are different. In yet another instance, key B is substantially an inverted key A except for m bits. The object encryptor 148 encrypts the at least a portion of the data object utilizing key B in accordance with the operational parameters (e.g., encryption algorithm type) to produce the encrypted portion of the data object as the output 164. The data compressor 302 compresses the encrypted portion of the data object to produce the encrypted data portion 304. The data compressor 302 sends the compressed encrypted portion of the data object as an encrypted data portion 304 to the access module of the DS processing unit to create encoded data slices and store the slices in the DSN memory. The method of the ingest function is discussed in greater detail with reference to FIG. 21.

FIG. 20 is another schematic block diagram of an embodiment of another retrieval function 310. As illustrated, the retrieval function 310 includes a key reference retriever 312, a key information de-compressor 314, a data de-compressor 316, and an object decryptor 182. In an example of operation, the key information de-compressor 314 retrieves key information 318 from a dispersed storage network (DSN) memory to produce a key reference number 322 and determines if the key information includes a key. The key information de-compressor 314 sends the key reference number 322 to the key reference retriever 312 when the key information de-compressor 314 determines that the key information 318 does not include a key. The key reference retriever 312 sends a retrieval request to the access module of the dispersed storage (DS) processing unit to retrieve key reference information 320 based on the key reference number 322. The key reference retriever 312 receives the key reference information 320 and determines the key information address 324 (e.g., the DSN address of the location where the key is stored that corresponds to the key reference profile). The key reference retriever 312 sends the key information address 324 to the key information de-compressor 314.

The key information de-compressor 314 retrieves key information 318 from the DSN memory based on the key information address to produce a key 190. The data de-compressor 316 retrieves and decompresses compressed encrypted data object information 192 from the DSN memory in accordance with the operational parameters to produce a de-compressed encrypted data object portion. The object decryptor 182 decrypts the de-compressed encrypted data object portion as an input 194 utilizing the key 190 in accordance with the operational parameters (e.g., decryption algorithm type) to produce a data object 198 as an output 196. The object decryptor 182 may aggregate portions of the retrieved data object to reproduce the requested data object 198. The object decryptor 182 sends the data object 198 to a requesting user device.

In another example of operation, the retrieval function 310 receives a retrieve data object message from a user device and determines operational parameters based on one or more of a user ID, a data object name, contents of the retrieve data object message, a vault lookup, a command, a predetermination, a table lookup, information about previously stored data objects, computing system status, and other determinations as a function of at least some of the previous variables. The retrieval function 310 determines DSN addresses where to retrieve the key information 318 and encrypted data object 192 based on the contents of the retrieve data object message, a vault lookup, and/or the operational parameters. The key information de-compressor 314 sends a retrieval request including the DSN address of the key information to the access module of a DS processing unit to retrieve compressed key information 318 from the DSN memory. The key information de-compressor 314 receives the compressed key information 318 and decompresses the compressed key information 318 in accordance with the operational parameters to produce key information. The key information de-compressor 314 determines a key reference number 322 from the key information and determines if the key information includes a key. The key information de-compressor 314 sends the key reference number 322 to the key reference retriever 312 when the key information de-compressor 314 determines that the key information does not include a key. The key reference retriever 312 sends a retrieval request to the access module of the DS processing unit to retrieve key reference information 320 from the DSN memory based on the key reference number 322. The key reference retriever receives the key reference information 320 and determines the key information address (e.g., the DSN address of the location where the key is stored that corresponds to the key reference profile). The key reference retriever 312 sends the key information address 324 to the key information de-compressor 314.

In the example of operation continued, the key information de-compressor 314 sends a retrieval request including the DSN address of the key information 324 (e.g., that includes the desired key) to the access module of the DS processing to retrieve key information 318 from the DSN memory. The key information de-compressor 314 receives the key information 318 and retrieves key information from the DSN memory based on the key information address to produce a key 190. The data de-compressor 316 sends a retrieval request to the access module of the DS processing including the DSN addresses of the encrypted data object to retrieve the compressed encrypted data object 192. The data de-compressor 316 decompresses the compressed encrypted data object 192 in accordance with the operational parameters to produce a de-compressed encrypted data object portion.

In the example of operation continued, the object decryptor 182 decrypts the de-compressed encrypted data object portion utilizing the key 190 in accordance with the operational parameters (e.g., decryption algorithm type). The object decryptor 182 may aggregate portions of the retrieved data object to reproduce the requested data object. The object decryptor 182 sends the data object 198 to the user device.

Figure 21:
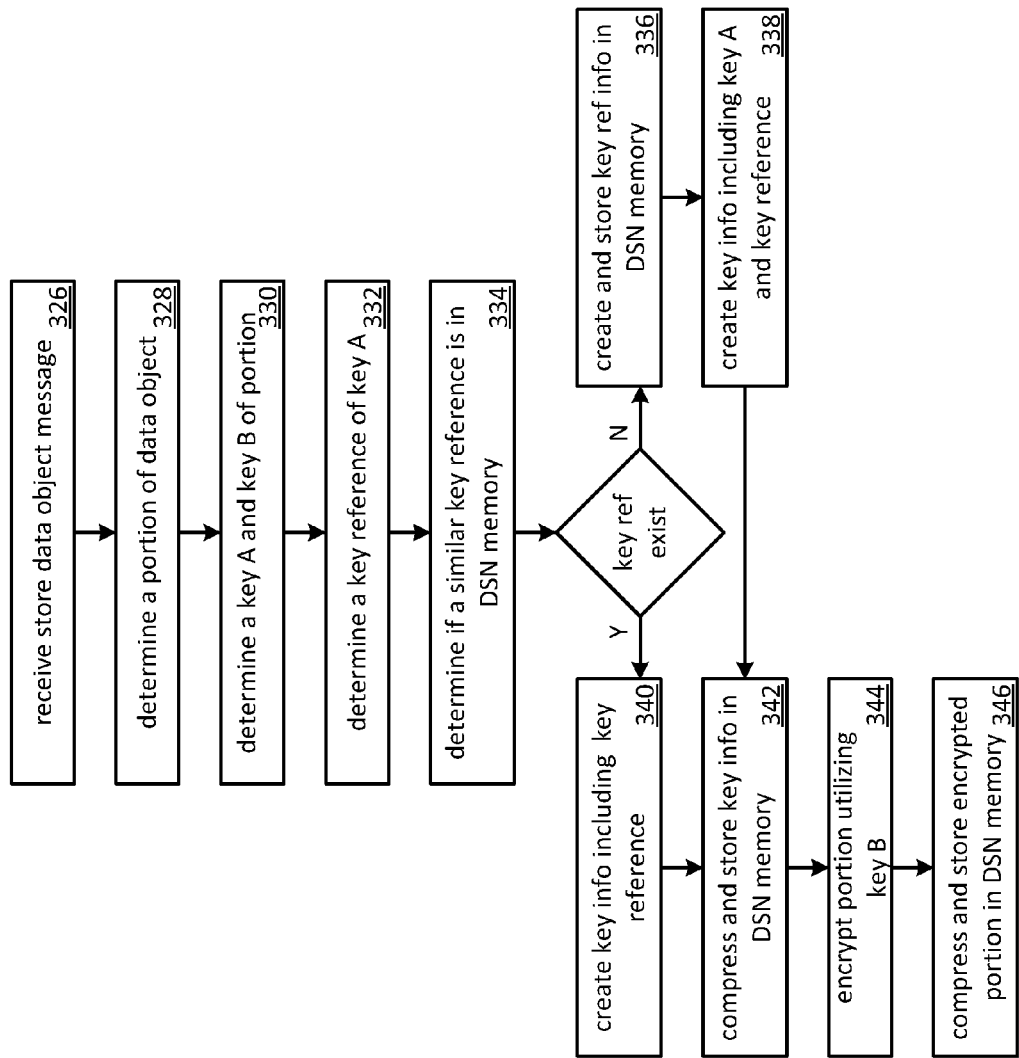
FIG. 21 is another flowchart illustrating another example of ingesting data in accordance with the invention.

FIG. 21 is another flowchart illustrating another example of ingesting data. The method begins with step 326 where a processing module (e.g., of an ingest function) receives a store data object message (e.g., from a user device). The store data object message may include one or more of a user identity (ID), a data object name, a data object, data, a data object hash, digital rights management information, a data size indicator, a data type indicator, a priority indicator, a security indicator, and a performance indicator. The processing module may determine operational parameters. Such a determination may be based on one or more of a user ID, a data object name, the contents of the store data object message, a vault lookup, a command, a predetermination, a table lookup, information about previously stored data objects, computing system status, and other determinations as a function of at least some of the previous variables.

The method continues at step 328 where the processing module determines at least a portion of the data object based on one or more of the operational parameters, a portion size indicator, a vault lookup, and information in the store data object message. In an example, the processing module determines the portion to be substantially the same as a data segment based on the user ID and a vault lookup. The method continues at step 330 where the processing module determines a key A and a key B based on one or more of the portion of the data object, an encryption algorithm, the operational parameters, and content of the store data object message. In an example, the processing module determines key A and/or key B as substantially the same as the portion of the data object. In another example, the processing module determines key A and/or key B as substantially an inverted portion of the data object. In another example, the processing module determines key A and/or key B as substantially the same as the portion of the data object except for n bits which are different. In another example, the processing module determines key A and/or key B as substantially an inverted portion of the data object except for m bits.

The method continues at step 332 where the processing module determines a key reference based on one or more of key A, the portion of the data object, a hash algorithm, an encryption algorithm, the operational parameters, and content of the store data object message. In an example, the processing module determines the key reference as a hash of key A. The method continues at step 334 where the processing module determines if a similar key reference is stored in a dispersed storage network (DSN) memory based on a search of the key reference information stored in the DSN memory and a comparison of the key reference profile to the key reference profiles retrieved in the search. The processing module determines that a similar key reference is stored in the DSN memory when the comparison reveals that the key reference is substantially the same as a key reference stored in the DSN memory.

The method branches to step 340 when the processing module determines that a similar key reference is stored in the DSN memory. The method continues to step 336 when the processing module determines that a similar key reference is not stored in the DSN memory. The method continues at step 336 where the processing module determines a DSN address of where key information will be stored based on the operational parameters and/or content of the store data object message. The processing module creates key reference information that includes the key reference number and the DSN address of where the key information will be stored. The processing module sends the key reference information to a DS processing module (e.g., to an access module of a DS processing unit) to store the key reference information in the DSN memory. The method continues at step 338 where the processing module creates key information including key A and the key reference. The method branches to step 342.

The method continues at step 340 where the processing module creates key information including the key reference when the ingest function determines that a similar key reference is stored in the DSN memory. Note that this step (e.g., where the key reference is stored rather than the key) may provide an efficiency of memory utilization improvement. The method continues at step 342 where the processing module compresses the key information to reduce the memory storage requirements. The processing module sends the compressed key information to the DS processing module to store the key information in the DSN memory by creating encoded key slices and storing the slices in the DSN memory.

The method continues at step 344 where the processing module encrypts the portion of the data object utilizing key B in accordance with the operational parameters (e.g., encryption algorithm type) to produce an encrypted portion. The method continues at step 346 where the processing module compresses the encrypted portion of the data object to produce a compressed encrypted portion. The processing module sends the compressed encrypted portion of the data object as an encrypted data portion to the DS processing module to create encoded data slices and store the slices in the DSN memory.

Figure 22:
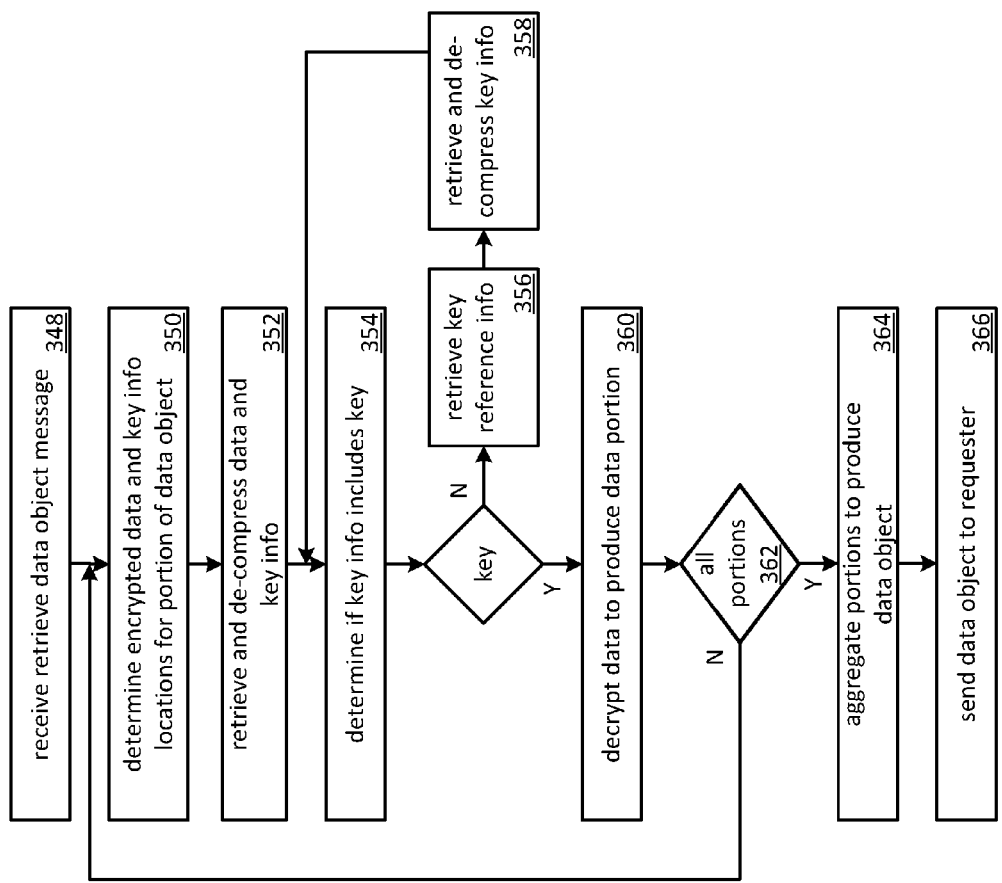
FIG. 22 is another flowchart illustrating another example of retrieving data in accordance with the invention.

FIG. 22 is another flowchart illustrating another example of retrieving data. The method begins with step 348 where a processing module (e.g., of a retrieval function) receives a retrieve data object message from a requester (e.g., from a user device). The retrieve data object message may include one or more of a user identity (ID), a data object name, a data object hash, digital rights management information, a data size indicator, a data type indicator, a priority indicator, a security indicator, and a performance indicator. The processing module may determine operational parameters. Such a determination may be based on one or more of a user ID, a data object name, contents of the retrieve data object message, a vault lookup, a command, a predetermination, a table lookup, information about previously stored data objects, computing system status, and other determinations as a function of at least some of the previous variables.

The method continues at step 350 where the processing module determines dispersed storage network (DSN) addresses where to retrieve key information and an encrypted data object based on the contents of the retrieve data object message, a vault lookup, and/or the operational parameters. The method continues at step 352 where the processing module sends a retrieval request including the DSN address of the encrypted data portion to a dispersed storage (DS) processing module (e.g., an access module of a DS processing unit) to retrieve a compressed encrypted data portion from a DSN memory. The processing module receives the compressed encrypted data portion and decompresses the compressed encrypted data portion in accordance with the operational parameters to produce an encrypted data portion. The processing module sends a retrieval request including the DSN address of the key information to the DS processing module to retrieve compressed key information from the DSN memory. The processing module receives the compressed key information and decompresses the compressed key information in accordance with the operational parameters to produce key information.

The method continues at step 354 where the processing module determines a key reference number from the key information and determines if the key information includes a key (e.g., a key in the key field). The method branches to step 360 when the retrieval function determines that the key information includes a key. The method continues to step 356 when the processing module determines that the key information does not include a key. The method continues at step 356 where the processing module sends a request to the DS processing module to retrieve key reference information based on the key reference number. The processing module receives the key reference information and determines key information address (e.g., the DSN address of the location where the key is stored that corresponds to the key reference). The method continues at step 358 where the processing module sends a retrieval request including the key information address (e.g., that includes the desired key) to the DS processing module to retrieve key information from the DSN memory. The processing module receives the key information to produce a key. The method repeats back to step 354.

The method continues at step 360 where the processing module decrypts the encrypted data portion utilizing the key in accordance with the operational parameters (e.g., decryption algorithm type) to produce a data portion. The method continues at step 362 where the processing module determines if all portions of the data object have been produced based on comparing the number and/or size of the portions produced so far to the data object size and/or number of total portions that comprise the data object. The method repeats back to step 350 when the processing module determines that all portions of the data object have not been produced. The method continues to step 364 when the processing module determines that all portions of the data object have been produced. The method continues at step 364 where the processing module aggregates the portion of the retrieved data object with other portions to reproduce the requested data object. The method continues at step 366 where the processing module sends the data object to the requester.

FIG. 23 is another schematic block diagram of an embodiment of another ingest function 368. As illustrated, the ingest function 368 includes a key generator 292, a portion reference generator 370, a portion reference profiler 372, a key package encoder 374, a key package decoder 376, an object encryptor 378, and a data compressor 302. In an example of operation, the portion reference generator 370 produces a portion reference based in part on a portion of the data object. In an example, the portion reference is a hash of the portion. The portion reference profiler 372 determines if a similar portion reference has been stored in a dispersed storage network (DSN) memory and saves the portion reference in the DSN memory as portion reference information 384 when the portion reference profiler determines that a similar portion reference has not been previously stored in the DSN memory. The key generator 292 generates a key 1 380 based in part on at least a portion of the data object and/or previously stored keys. The key package encoder 374 creates a key package that includes key 1 and the portion reference. The key package encoder 374 compresses the key package to reduce the memory storage requirements. The key package encoder 374 sends the compressed key package as key information 306 to an access module of a DS processing unit to create encoded key slices and store the slices in the DSN memory.

In the example of operation continued, the object encryptor 378 encrypts the portion as an input 158 utilizing key 1 380 in accordance with operational parameters to produce an encrypted data portion as an output 381. The data compressor 302 compresses the encrypted data portion in accordance with the operational parameters to produce a compressed encrypted data portion. The data compressor 302 sends the compressed encrypted data portion as an encrypted data portion 304 to the access module of the DS processing unit for storage in the DSN memory as encoded data slices.

In the example of operation continued, the key package decoder 376 retrieves key information 306 from the DSN memory to produce key 1 382 when the portion reference profiler 372 determines that a similar portion reference has been stored in the DSN memory. The key package decoder 376 generates key 2 382 based in part on the operational parameters. The key package decoder 376 creates a key package that includes key 2 and the portion reference. The key package decoder compresses the key package to reduce the memory storage requirements. The key package decoder 376 sends the compressed key package as key information 306 to the access module of the DS processing unit to create encoded key slices and store the slices in the DSN memory. The object encryptor 378 encrypts the portion 158 utilizing key 1 and key 2 from the key package decoder 376 in accordance with the operational parameters to produce the encrypted data portion as the output 381. The data compressor 302 compresses the encrypted data portion in accordance with the operational parameters to produce a compressed encrypted data portion. The data compressor 302 sends the compressed encrypted data portion as an encrypted data portion 304 to the access module of the DS processing unit for storage in the DSN memory as encoded data slices.

In another example of operation, the ingest function 368 receives a store data object message from a user device including a data object 156. The ingest function 368 determines operational parameters based on one or more of a user ID, a data object name, contents of the store data object message, a vault lookup, a command, a predetermination, a table lookup, information about previously stored data objects, computing system status, and other determinations as a function of at least some of the previous variables. The portion reference generator 370 selects at least a portion of the data object 156 and generates the portion reference based in part on the portion of the data object and the operational parameters. In an example, the portion reference is a hash of the portion. In another example, portion reference is a hash of a key.

In the example of operation continued, the portion reference profiler 372 determines if a similar portion reference has been stored in the DSN memory based on a DSN memory search of portion reference information. The portion reference profiler 372 determines the DSN address of where the key information will be stored based on the operational parameters and/or a vault lookup when the portion reference profiler determines that a similar portion reference is not stored in the DSN memory. The portion reference profiler 372 creates new portion reference information including the DSN address of where the key information will be stored and the portion reference. The portion reference profiler 372 sends the portion reference information 384 to the access module of the DS processing unit for storage in the DSN memory as portion reference information 384. The key generator 292 generates a key 1 380 based in part on at least a portion of the data object, the operational parameters, and/or previously stored keys. In an example, key 1 is substantially the same as the portion of the data object. In another example, key 1 is substantially an inverted portion of the data object. In another example, key 1 is substantially the same as the portion of the data object except for n bits which are different. In another example, key 1 is substantially an inverted portion of the data object except for m bits.

In the example of operation continued, the key package encoder 374 creates a key package that includes key 1 and the portion reference. The key package encoder 374 compresses the key package in accordance with the operational parameters to produce a compressed key package. The key package encoder 374 sends the compressed key package as key information 306 to the access module of the DS processing unit to create encoded key slices and store the slices in the DSN memory. The object encryptor 378 encrypts the portion utilizing key 1 380 in accordance with the operational parameters to produce an encrypted data portion as an output 381. In an example, encrypted data=portion−key 1.

The data compressor 302 compresses the encrypted data portion in accordance with the operational parameters to produce a compressed encrypted data portion. The data compressor 302 sends the compressed encrypted data portion as an encrypted data portion 304 to the access module of the DS processing unit for storage in the DSN memory as encoded data slices.

In the example of operation continued, the key package decoder 376 sends a retrieval request for key information to the access module of the DS processing unit to retrieve key information 306 from the DSN memory to produce key 1 when the portion reference profiler 372 determines that a similar portion reference has been stored in the DSN memory. The key package decoder 376 receives the key information 306. The key package decoder 376 generates key 2 (e.g., an "encryption pattern sequence") based in part on the operational parameters. In an example, key 2 is substantially a random number the same size as the portion of the data object with properties specified in the operational parameters. In another example, key 2 is the same size as the portion of the data object containing all zeros except for p random bits that have a value of one. In another example, key 2 is substantially the same as the portion of the data object. In another example, key 2 is substantially an inverted portion of the data object. In another example, key 2 is substantially the same as the portion of the data object except for n bits which are different. In another example, key 2 is substantially an inverted portion of the data object except for m bits.

In the example of operation continued, the key package decoder 376 creates a key package that includes key 2 and the portion reference. The key package decoder 376 compresses the key package in accordance with the operational parameters to produce a compressed key package. The key package decoder 376 sends the compressed key package as key information 306 to the access module of the DS processing unit to create encoded key slices and store the slices in the DSN memory. The object encryptor 378 encrypts the portion utilizing key 1 and key 2 from the key package decoder 376 in accordance with the operational parameters to produce the encrypted data portion. For example, encrypted data=portion−key 1+key 2. The data compressor 302 compresses the encrypted data portion in accordance with the operational parameters to produce a compressed encrypted data portion. The data compressor sends the compressed encrypted data portion as an encrypted data portion 304 to the access module of the DS processing unit for storage in the DSN memory as encoded data slices. The method to store the data object is discussed in greater detail with reference to FIG. 25.

FIG. 24 is another schematic block diagram of an embodiment of another retrieval function 386. As illustrated, the retrieval function 36 includes a portion reference retriever create, a key package decoder 390, a data de-compressor 316, and an object decryptor 392. In an example of operation, the key package decoder 390 retrieves key information 318 from a dispersed storage network (DSN) memory to produce compressed key information. The key package decoder 390 decompresses the key information to produce a portion reference number 394 and a key 2 398. The key package decoder 390 sends the portion reference number 394 to the portion reference retriever 388. The portion reference retriever 388 sends a retrieval request to an access module of a dispersed storage (DS) processing unit to retrieve portion reference information 320 based on the portion reference number. The portion reference retriever 388 receives the portion reference information 320 and determines a key information address 324 (e.g., a DSN address of the location where the key is stored that corresponds to the portion reference). The portion reference retriever 388 sends the key information address 324 to the key package decoder 390.

In the example of operation continued, the key package decoder 390 retrieves key information 318 from the DSN memory based on the key information address 324 to produce compressed key information. The key package decoder 390 decompresses the key information to produce key 1 396. The data de-compressor 316 retrieves compressed encrypted data portion information 400 from the DSN memory by sending a request to the access module of the DS processing unit. The data de-compressor 316 decompresses the compressed encrypted data portion information 400 from the DSN memory in accordance with the operational parameters to produce a de-compressed encrypted data object portion. The object decryptor 392 decrypts the de-compressed encrypted data object portion as an input 194 utilizing the key 1 396 and key 2 398 in accordance with the operational parameters (e.g., decryption algorithm type) to produce a portion of a data object as an output 196. The object decryptor 392 may aggregate portions of the retrieved data object to reproduce the requested data object. The object decryptor 392 sends the data object 198 to a requester (e.g., a user device).

In another example of operation, the retrieval function 386 receives a retrieve data object message from a user device and determines operational parameters based on one or more of a user ID, a data object name, contents of the retrieve data object message, a vault lookup, a command, a predetermination, a table lookup, information about previously stored data objects, computing system status, and other determinations as a function of at least some of the previous variables. The retrieval function 386 determines DSN addresses where to retrieve key information and encrypted data portion based on one or more of contents of the retrieve data object message, a vault lookup, and the operational parameters. The key package decoder 390 sends a retrieval request including the DSN address of the key information 318 to an access module of a DS processing unit to retrieve compressed key information from a DSN memory. The key package decoder 390 receives the compressed key information 318 and decompresses the compressed key information in accordance with the operational parameters to produce key information. The key package decoder 390 determines a portion reference number 394 from the key information and a key 2 398. The key package decoder 390 sends the portion reference number 394 to the portion reference retriever 388. The portion reference retriever 388 sends a retrieval request to the access module of the DS processing unit to retrieve portion reference information 320 from the DSN memory based on the portion reference number. The portion reference retriever 388 receives the portion reference information 320 and determines the key information address 324 (e.g., the DSN address of the location where the key is stored that corresponds to the portion reference). The portion reference retriever 388 sends the key information address 324 to the key package decoder 390.

In the another example of operation continued, the key package decoder 390 sends a retrieval request including the key information address 324 (e.g., that includes the desired key) to the access module of the DS processing to retrieve compressed key information 318 from the DSN memory. The key package decoder 390 receives the compressed key information 318 and decompresses the compressed key information 318 in accordance with the operational parameters to produce key information. The key package decoder 390 determines key 1 396 from the key information. Note that the key package decoder 390 produces key 2=0 when the key package decoder determines that key 2=key 1.

In the another example of operation continued, the data de-compressor 316 sends a retrieval request to the access module of the DS processing including the DSN addresses of the encrypted data object to retrieve a portion of a compressed encrypted data object 400. The data de-compressor 316 decompresses the compressed encrypted data object 400 in accordance with the operational parameters to produce a de-compressed encrypted data object portion. The object decryptor 392 decrypts the de-compressed encrypted data object portion as an input 194 utilizing key 1 396 and key 2 398 in accordance with the operational parameters (e.g., decryption algorithm type) to produce a portion of a data object 198 as an output 196. In an example, the portion=encrypted data portion+key 1–key 2. The object decryptor 392 may aggregate portions of the retrieved data object to reproduce the requested data object 198. The object decryptor 392 sends the data object 198 to the user device. The method of data object retrieval is discussed in greater detail with reference to FIG. 26.

Figure 25:
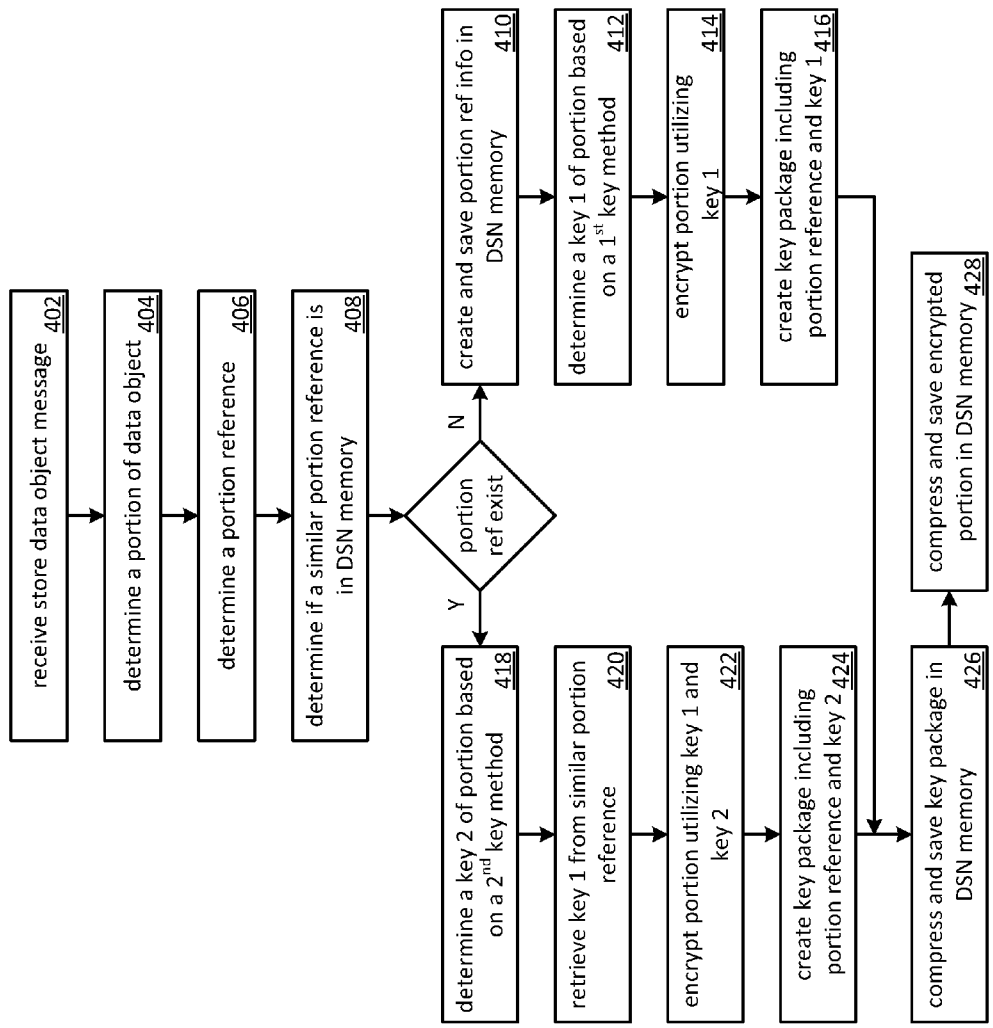
FIG. 25 is another flowchart illustrating another example of ingesting data in accordance with the invention.

FIG. 25 is another flowchart illustrating another example of ingesting data. The method begins with step 402 rate processing module (e.g., of an ingest function) receives a store data object message (e.g., from a user device). The store data object message may include one or more of a user identity (ID), a data object name, a data object, data, a data object hash, digital rights management information, a data size indicator, a data type indicator, a priority indicator, a security indicator, and a performance indicator. The processing module may determine operational parameters. Such a determination may be based on one or more of a user ID, a data object name, the contents of the store data object message, a vault lookup, a command, a predetermination, a table lookup, information about previously stored data objects, computing system status, and other determinations as a function of at least some of the previous variables.

The method continues at step 404 where the processing module determines at least a portion of the data object based on one or more of the operational parameters, a portion size indicator, a vault lookup, and information in the store data object message. In an example, the processing module determines the portion to be substantially the same as a data segment based on the user ID and a vault lookup. The method continues at step 406 where the processing module determines a portion reference based on one or more of the portion of the data object, a hash algorithm, a hash of the portion reference, an encryption algorithm, the operational parameters, and content of the store data object message. In an example, the ingest function determines the portion reference as a hash of the portion.

The method continues at step 408 where the processing module determines if a similar portion reference is in a dispersed storage network (DSN) memory based on a search of portion reference information stored in the DSN memory and a comparison of the portion reference to the portion references retrieved in the search of the DSN memory. The processing module determines that a similar portion reference is in the DSN memory when the comparison reveals that the portion reference is substantially the same as a portion reference in the DSN memory. The method branches to step 418 when the processing module determines that a similar key reference is stored in the DSN memory. The method continues to step 410 when the processing module determines that a similar key reference is not stored in the DSN memory.

The method continues at step 410 where the processing module determines a DSN address of where the key information will be stored based on the operational parameters and/or content of the store data object message. The processing module creates portion reference information that includes the portion reference and the DSN address of where the key information will be stored. The processing module sends the portion reference information to an access module of a dispersed storage (DS) processing unit to store the portion reference information in the DSN memory. The method continues at step 412 where the processing module determines a first key method. Such a determination may be based on one or more of the operational parameters, the results of the search for a similar portion reference, the portion, the portion reference, an encryption algorithm, a user ID, a data object name, the contents of the store data object message, a vault lookup, a command, a predetermination, a table lookup, information about previously stored data objects, computing system status, and other determinations as a function of at least some of the previous variables. The processing module determines a key 1 of the portion based on the first key method and the portion. In an example, key 1 is substantially the same as the portion except for m bits that are different to achieve a desired result in the encryption of the portion. Note that the key method may result in an encrypted portion that is compressible in a favorable way (e.g., highly compressible compared to random data). For instance, m=1 such that key 1 is identical to the portion except for one bit.

The method continues at step 414 where the processing module encrypts the portion utilizing key 1 in accordance with the operational parameters to produce an encrypted portion. In an example, the encrypted portion may be expressed as: encrypted portion=portion–key 1. Note that the encrypted portion has few bits and may be highly compressible when key 1 is one bit different that the portion. The method continues at step 416 where the processing module creates a key package including the portion reference and key 1. The method branches to step 426 to save the key package in the DSN memory.

The method continues at step 418 where the processing module determines a second key method to determine key 2 when the processing module determines that a similar key reference is in the DSN memory. Such a determination of the second key method may be based on one or more of the operational parameters, results of the search for a similar portion reference, the portion, the portion reference, an encryption algorithm, a user ID, a data object name, the contents of the store data object message, a vault lookup, a command, a predetermination, a table lookup, information about previously stored data objects, computing system status, and other determinations as a function of at least some of the previous variables. The processing module determines key 2 of the portion based on the second key method and/or the portion. In an example, key 2 is a number field the size of the portion with all zeros except for m random bits that are ones to achieve a desired result in the encryption of the portion. Note that the key method may result in an encrypted portion that is compressible in a favorable way (e.g., highly compressible compared to random data) and/or key 2 that is compressible in a favorable way. For instance, m=1 such that key 2 has 999,999,999 zeros and 1 one when the portion is one million bits wide.

The method continues at step 420 where the processing module retrieves key 1 from the similar portion reference by a lookup of the portion reference information in the DSN memory to retrieve the DSN address of the key information for this portion reference followed by a retrieval of the key information based on the retrieved DSN address to extract the key 1. Note that key 1 may have been in the DSN memory as key information when the store sequence was executed for the portion with the similar portion reference. The method continues at step 422 where the processing module encrypts the portion utilizing key 1 and key 2 in accordance with the operational parameters to produce an encrypted portion. In an example, the encrypted portion may be expressed as: encrypted portion=portion−key 1+key 2. Note that the encrypted portion for this portion with a similar portion reference has few bits and may be highly compressible when key 1 is one bit different than the portion and key 2 is all zeros except for one bit. Note that the method may provide an efficiency of memory utilization improvement. The method continues at step 424 where the processing module creates a key package including the portion reference and key 2.

The method continues at step 426 where the processing module compresses the key package in accordance with the operational parameters to produce a compressed key package. The processing module sends the compressed key package to the access module of the DS processing unit to store the compressed key package as key information in the DSN memory. The method continues at step 428 where the processing module compresses the encrypted portion in accordance with the operational parameters to produce a compressed encrypted portion. The processing module sends compressed encrypted portion to the access module of the DS processing unit to store the compressed encrypted portion as an encrypted data portion in the DSN memory.

Figure 26:
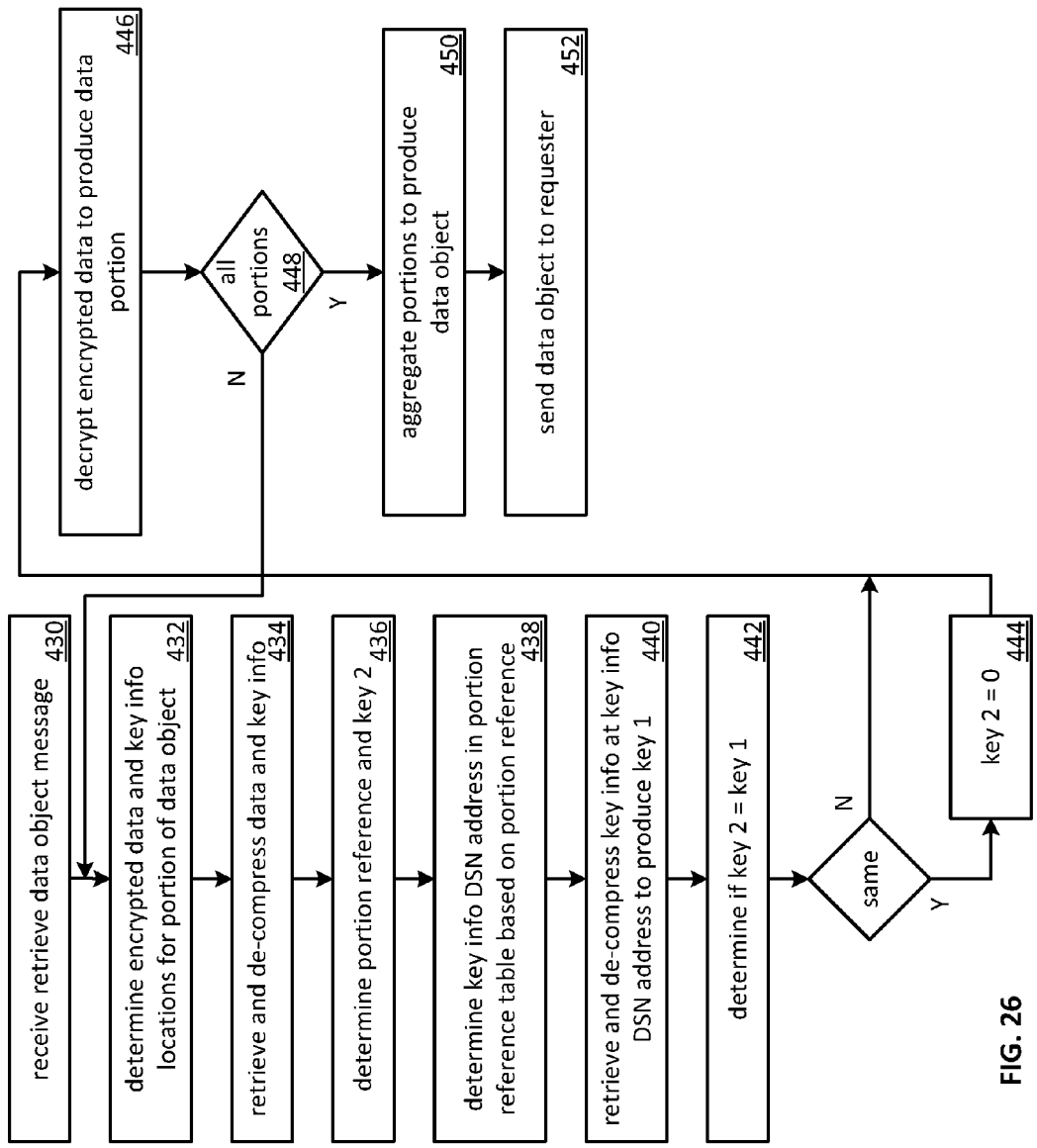
FIG. 26 is another flowchart illustrating another example of retrieving data in accordance with the invention.

FIG. 26 is another flowchart illustrating another example of retrieving data. The method begins with step 430 where a processing module (e.g., of a retrieval function) receives a retrieve data object message from a requester (e.g., from a user device). The retrieve data object message may include one or more of a user identity (ID), a data object name, a data object hash, digital rights management information, a data size indicator, a data type indicator, a priority indicator, a security indicator, and a performance indicator. The processing module may determine operational parameters. Such a determination may be based on one or more of a user ID, a data object name, contents of the retrieve data object message, a vault lookup, a command, a predetermination, a table lookup, information about previously stored data objects, computing system status, and other determinations as a function of at least some of the previous variables.

The method continues at step 432 where the processing module determines dispersed storage network (DSN) addresses where to retrieve key information and an encrypted data object based on the contents of the retrieve data object message, a vault lookup, and/or the operational parameters. The method continues at step 434 where the processing module sends a retrieval request including the DSN address of the encrypted data portion to a dispersed storage (DS) processing module (e.g., an access module of a DS processing unit) to retrieve a compressed encrypted data portion from a DSN memory. The processing module receives the compressed encrypted data portion and decompresses the compressed encrypted data portion in accordance with the operational parameters to produce an encrypted data portion. The processing module sends a retrieval request including the DSN address of the key information to the DS processing module to retrieve compressed key information from the DSN memory. The processing module receives the compressed key information and decompresses the compressed key information in accordance with the operational parameters to produce key information.

The method continues at step 436 where the processing module determines (e.g., extracts) a portion reference and a key 2 from the key information. The method continues at step 438 where the processing module retrieves a key information DSN address stored in a portion reference information table based on the retrieved portion reference. The method continues at step 440 where the processing module sends a retrieval request including the DSN address of the key information to the access module of the DS processing to retrieve compressed key information from the DSN memory. The processing module receives the compressed key information and decompresses the compressed key information in accordance with the operational parameters to produce key information. The processing module extracts a key 1 from the key information.

The method continues at step 442 where the processing module determines if key 2 equals key 1 by a comparison. The method branches to step 446 when the processing module determines that key 2 does not equal key 1. The method continues to step 444 when the processing module determines that key 2 equals key 1. The method continues at step 444 where the processing module establishes key 2 as all zeros. The method continues at step 446 where the processing module decrypts the encrypted data portion utilizing key 1 and key 2 in accordance with the operational parameters to produce a data portion. In an example, the data portion may be expressed as: data portion=encrypted data portion+key 1−key 2.

The method continues at step 448 where the processing module determines if all portions of the data object have been produced based on comparing the number and/or size of the portions produced so far to the data object size and/or number of total portions that comprise the data object. The method repeats back to step 432 when the processing module determines that all portions of the data object have not been produced. The method continues to step 450 when the processing module determines that all portions of the data object have been produced. The method continues at step 450 where the processing module aggregates the portions of the retrieved data object to reproduce the requested data object. The method continues at step 452 where the processing module sends the data object to the requester (e.g., the user device).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, alphanumeric and numeric values, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A data deduplication method for execution by a computing device, wherein the method comprises:
   receiving a storage request regarding storing a data object in dispersed storage network (DSN) memory;
   determining a data portion of the data object;
   determining that a substantially identical data portion is stored in the DSN memory;
   obtaining an encryption pattern sequence for the substantially identical data portion;
   retrieving an encryption key of the substantially identical data portion from the DSN memory, wherein, based on the encryption pattern sequence, a first portion of the encryption key is identical to a first portion of the substantially identical data portion and a second portion of the encryption key is identical to an inverted second portion of the substantially identical data portion;
   encrypting the data portion using the encryption key and the encryption pattern sequence to produce an encrypted data portion that includes a plurality of encrypted data segments;
   compressing the encrypted data portion using a pattern based data compression function to produce a compressed data portion; and
   facilitating storage of the compressed data portion and the encryption pattern sequence in response to the storage request.

2. The method of claim 1 further comprises:
   compressing the encryption pattern sequence to produce a compressed encryption pattern sequence; and
   sending the compressed encryption pattern sequence to the DSN memory for storage therein.

3. The method of claim 2, wherein the step of determining that a substantially identical data portion is stored in the DSN memory includes:
   determining a portion reference for the data portion;
   retrieving stored portion reference information from the DSN memory; and
   comparing the portion reference to the stored portion reference information to determine that the stored portion reference information includes substantially the same portion reference.

4. The method of claim 3 further comprises:
   sending the portion reference to the DSN memory for storage therein in combination with the compressed encryption pattern sequence.

5. The method of claim 3, wherein the portion reference for the data portion is based on at least one of:
   a portion of the data portion;
   a hash algorithm;
   a calculated hash of the data portion;
   an encryption algorithm;
   operational parameters; or
   content of a store data object message relating to the data object.

6. The method of claim 1, wherein the compressed data portion includes a plurality of compressed data segments, and wherein compressing the encrypted data portion comprises:
   compressing a first data segment of the compressed data portion using a using a first portion of the encryption pattern sequence and a first compression function of the pattern based data compression function; and
   compressing a second data segment of the compressed data portion using a second portion of the encryption pattern sequence and a second compression function of the pattern based data compression function.

7. The method of claim 1, wherein storing the compressed data portion comprises:
   storing the compressed data portion in local memory of the computing device.

8. The method of claim 1, wherein the encryption key comprises at least one of:
   a substantially identical version of the data portion;
   a substantially identical portion of the data portion; or an inversion of a substantially identical version of the data portion.

9. The method of claim 1, wherein encrypting the data portion using the encryption key and the encryption pattern sequence comprises:
  encrypting the first portion of the data portion using a first encrypting function; and
  encrypting a second portion of the data portion using a second encrypting function.

10. The method of claim 9, wherein encrypting the data portion using the encryption key and the encryption pattern sequence includes:
  subtracting the first portion of the encryption key from the first portion of the data portion to produce a first encrypted data segment of the plurality of encrypted data segments; and
  exclusive ORing a second portion of the encryption key with the second portion of the data portion to produce a second encrypted data segment of the plurality of encrypted data segments.

11. A non-transitory computer readable storage medium having accessible therefrom a set of instructions interpretable by a processing module, the set of instructions being configured to cause the processing module to carry out operations for:
  receiving a storage request regarding storing a data object in dispersed storage network (DSN) memory;
  determining a data portion of the data object;
  determining that a substantially identical data portion is stored in the DSN memory;
  obtaining an encryption pattern sequence for the substantially identical data portion;
  retrieving an encryption key of the substantially identical data portion from the DSN memory, wherein, based on the encryption pattern sequence, a first portion of the encryption key is identical to a first portion of the substantially identical data portion and a second portion of the encryption key is identical to an inverted second portion of the substantially identical data portion;
  encrypting the data portion using the encryption key and the encryption pattern sequence to produce an encrypted data portion that includes a plurality of encrypted data segments;
  compressing the encrypted data portion using a pattern based data compression function to produce a compressed data portion; and
  facilitating storage of the compressed data portion and the encryption pattern sequence in response to the storage request.

12. The non-transitory computer readable storage medium of claim 11, wherein the set of instructions further causes the processing module to carry out operations for:
  compressing the encryption pattern sequence to produce a compressed encryption pattern sequence; and
  sending the compressed encryption pattern sequence to the DSN memory for storage therein.

13. The non-transitory computer readable storage medium of claim 12, wherein the set of instructions further causes the processing module to carry out operations for determining that a substantially identical data portion is stored in the DSN memory by:
  determining a portion reference for the data portion;
  retrieving stored portion reference information from the DSN memory; and
  comparing the portion reference to the stored portion reference information to determine that the stored portion reference information includes substantially the same portion reference.

14. The non-transitory computer readable storage medium of claim 13, wherein the set of instructions further being configured to cause the processing module to carry out operations for:
  sending the portion reference to the DSN memory for storage therein in combination with the compressed encryption pattern sequence.

15. The non-transitory computer readable storage medium of claim 13, wherein the set of instructions further being configured to cause the processing module to carry out operations for:
  encrypting the first portion of the data portion using a first encrypting function; and
  encrypting a second portion of the data portion using a second encrypting function.

16. The non-transitory computer readable storage medium of claim 13, wherein the set of instructions further being configured to cause the processing module to carry out operations for:
  subtracting the first portion of the encryption key from the first portion of the data portion to produce a first encrypted data segment of the plurality of encrypted data segments; and
  exclusive ORing a second portion of the encryption key with the second portion of the data portion to produce a second encrypted data segment of the plurality of encrypted data segments.

17. The non-transitory computer readable storage medium of claim 11, wherein the set of instructions further causes the processing module to carry out operations for the storing of the compressed data portion by:
  dispersed storage error encoding the compressed data portion to produce one or more sets of encoded data slices; and
  sending the one or more sets of encoded data slices to the DSN memory for storage therein.

* * * * *